US011558523B2

(12) United States Patent
Sasaki

(10) Patent No.: US 11,558,523 B2
(45) Date of Patent: Jan. 17, 2023

(54) IMAGE FORMING APPARATUS THAT GENERATES A FUNCTION EXECUTION MODULE FOR AN OPERATING-SYSTEM-INDEPENDENT ENVIRONMENT

(71) Applicant: Canon Kabushiki Kaisha, Tokyo (JP)

(72) Inventor: Hidemi Sasaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/228,904

(22) Filed: Apr. 13, 2021

(65) Prior Publication Data
US 2021/0321012 A1  Oct. 14, 2021

(30) Foreign Application Priority Data

Apr. 14, 2020 (JP) .............................. JP2020-072372

(51) Int. Cl.
 *H04N 1/00* (2006.01)
 *G06F 9/50* (2006.01)
(52) U.S. Cl.
 CPC ....... *H04N 1/00782* (2013.01); *G06F 9/5011* (2013.01); *H04N 1/00427* (2013.01); *H04N 1/00474* (2013.01); *H04N 1/00689* (2013.01); *H04N 1/00694* (2013.01)
(58) Field of Classification Search
 None
 See application file for complete search history.

(56) References Cited

U.S. PATENT DOCUMENTS

| 10,025,924 | B1 | 7/2018 | Vagin |
| 2015/0120935 | A1* | 4/2015 | Fukasawa .............. G06F 9/5011 709/226 |
| 2018/0232253 | A1* | 8/2018 | Michimura ........... G06F 9/4881 |
| 2019/0273829 | A1* | 9/2019 | Ohhashi .................. H04L 67/02 |

(Continued)

FOREIGN PATENT DOCUMENTS

JP  2018129003 A  8/2018

OTHER PUBLICATIONS

Watada, Junzo et al. "Emerging Trends, Techniques and Open Issues of Containerization: A Review", IEEE Access, vol. 7, Oct. 31, 2019, pp. 152443-152472 (Provided by Applicant on Sep. 7, 2021) (Year: 2019).*

(Continued)

*Primary Examiner* — Miya J Williams
(74) *Attorney, Agent, or Firm* — Venable LLP

(57) ABSTRACT

The present invention provides an image forming apparatus comprising: at least one first module and at least one second module configured to execute functions corresponding respectively to the at least one first module; a first control unit configured to notify, to a corresponding second module, a request accepted by the at least one first module; and a second control unit configured to control in accordance with the notification from the first control unit, the corresponding second module, wherein the at least one first module is activated at all times from when the image forming apparatus is activated, and the at least one second module is generated as a container of an execution environment that is independent of an operating system and whose activation state is controlled by an instruction from the second control unit.

16 Claims, 15 Drawing Sheets

(56) References Cited

U.S. PATENT DOCUMENTS

2019/0303124 A1* 10/2019 Ohhashi .................. G06F 8/30
2020/0019359 A1*  1/2020 Shirai .................. G06F 3/1254
2020/0272488 A1*  8/2020 Strode, Jr. ........... G06F 9/44505

OTHER PUBLICATIONS

Argawal, Nitin "Lifecycle of DockerContainer", Jan. 5, 2017, pp. 1-4 (Provided by Applicant on Sep. 7, 2021) (Year: 2017).*
Extended European Search Report dated Aug. 27, 2021 in counterpart European Patent Appln. No. 21167257.
Watada Junzo et al.: "Emerging Trends, Techniques and Open Issues of Containerization: A Review", IEEE Access, vol. 7, Oct. 31, 2019 (Oct. 31, 2019), pp. 152443-152472,XP011752282, DOI: 10.1109/ACCESS.2019.2945930 [retrieved on Oct. 25, 2019].
Agarwal Nitin: "Lifecycle of DockerContainer", , Jan. 5, 2017 (Jan. 5, 2017), pp. 1-4, XP55832757, Retrieved from the Internet: URL:https://medium.com/@BeNitinAgarwal/lifecycle-of-docker-container-d2da9f85959 [retrieved on Aug. 18, 2021].
"Dockerfile reference", Apr. 13, 2020 (Apr. 13, 2020), pp. 1-29, XP55832759, Retrieved from the Internet: URL:https://web.archive.org/web/20200413131745/https://docs.docker.com/engine/reference/builder/ [retrieved on Aug. 18, 2021].
European Office Action dated May 12, 2022 in counterpart European Patent Appln. No. 21167257.1.

* cited by examiner

F I G. 3

| | +0h | +1h | +2h | +3h | +4h | +5h | +6h | +7h | +8h | +9h | +Ah | +Bh | +Ch | +Dh | +Eh | +Fh |
|---|---|---|---|---|---|---|---|---|---|---|---|---|---|---|---|---|
| 0h | CONTROL COMMAND VERSION (=0XC0CAFF01) | | | | CONTROL COMMAND IDENTIFIER, CONTROL RESPONSE IDENTIFIER | | | | USER IDENTIFIER | | | | | | | |
| 10h | CONTROL COMMAND/ CONTROL RESPONSE UNIQUE DATA LENGTH | | | | | | | | | | | | | | | |
| 20h | CONTROL COMMAND/CONTROL RESPONSE UNIQUE DATA BODY PORTION | | | | | | | | | | | | | | | |
| 30h | | | | | | | | | | | | | | | | |
| 40h | | | | | | | | | | | | | | | | |
| 50h | ⋯ ⋯ | | | | | | | | | | | | | | | |

(NETWORK BYTE ORDER)

FIG. 4A

```
// CONTROL COMMAND IDENTIFIER
enum CONTROL_COMMAND{
        // TARGET OPTION
        CC_TARGET_COPY              =0X10, // COPY APP
        CC_TARGET_SEND              =0X20, // Send APPLICATION
        CC_TARGET_PDL               =0X30, // PDL APPLICATION
        CC_TARGET_WEBBROW           =0X40, // WEB BROWSER APPLICATION
        CC_TARGET_FAX               =0X50, // FAX APPLICATION
        CC_TARGET_USER_START        =0X80, // USER APPLICATION (START)
        CC_TARGET_USER_END          =0XFE, // USER APPLICATION (END)
        CC_TARGET_DEVICE            =0XFF, // DEVICE // RECEPTION UNIT CONTROL COMMAND
        CC_RECEPTOR_CMD_START       =0XF000, // ACTIVATE RECEPTION UNIT // APPLICATION CONTROL COMMAND
        CC_APPLICATION_CMD_EXECUTE  =0XA100, // EXECUTE
        CC_APPLICATION_CMD_STOP     =0XA500, // PAUSE
        CC_APPLICATION_CMD_C_FLUSH  =0XA700, // REQUEST CACHE MEMORY FLASH
        CC_APPLICATION_CMD_CANCEL   =0XAF00, // CANCEL // CONTAINER CONTROL COMMAND
        CC_CONTAINER_CMD_CREATE     =0XC000, // GENERATE CONTAINER
        CC_CONTAINER_CMD_START      =0XC100, // ACTIVATE CONTAINER
        CC_CONTAINER_CMD_PAUSE      =0XC200, // STOP CONTAINER
        CC_CONTAINER_CMD_UNPAUSE    =0XC300, // RETURN CONTAINER
        CC_CONTAINER_CMD_UPDATE     =0XC700, // CHANGE CONTAINER SETTING
        CC_CONTAINER_CMD_STOP       =0XCD00, // END CONTAINER
        CC_CONTAINER_CMD_REMOVE     =0XCE00, // DISCARD CONTAINER
        CC_OONTAINER_CMD_GET_STATUS =0XCF00, // ACQUIRE CONTAINER STATE // DEVICE CONTROL COMMAND
        CC_DEVICE_CMD_WAKEUP        =0XD000, // RETURN FROM SLEEP
        CC_DEVICE_CMD_SLEEP         =0XD100, // ENTER SLEEP
        CC_DEVICE_CMD_PANELOFF      =0XD200, // TURN ON PANEL
        CC_DEVICE_CMD_PANELON       =0XD300, // TURN OFF PANEL
        CC_DEVICE_CMD_QUICKOFF      =0XD400, // POWER OFF FOR HIGH SPEED RETURN
        CC_DEVICE_CMD_POWEROFF      =0XDF00, // POWER OFF
};
```

FIG. 4B

```
//GENERAL-PURPOSE CONTROL RESPONSE IDENTIFIER I
enum CC_RESPONSE{
        CC_RESPONSE_OK              =0X0000, // SUCCESSFUL
        CC_RESPONSE_NG              =0X0001, // UNSUCCESSFUL
};

//CONTAINER STATE CONTROL RESPONSE IDENTIFIER
enum CC_STATUS{
        CC_RESPONSE_NONEXISTS       =0X8000, // CONTAINER NON-EXISTING STATE
        CC_RESPONSE_CREATED         =0X0000, // CONTAINER NON-ACTIVATION STATE
        CC_RESPONSE_RUNNING         =0X0001, // CONTAINER ACTIVATION STATE
        CC_RESPONSE_PAUSED          =0X0002, // CONTAINER STOPPED STATE
        CC_RESPONSE_RESTARTING      =0X0003, // CONTAINER REACTIVATION IN PROGRESS
        CC_RESPONSE_EXITED          =0X0004, // CONTAINER TERMINATION IN PROGRESS
        CC_RESPONSE_REMOVING        =0X0005, // CONTAINER DELETION IN PROGRESS
        CC_RESPONSE_DEAD            =0X0006, // CONTAINER STOP FAILURE IN PROGRESS
};
```

FIG. 6

```
1. #Dockerfile for copyserver

2. #WHEN GENERATING CONTAINER
3. #1. ACQUIRE Docker IMAGE FROM PRIVATE REGISTRY
4. FROM appimage:1.0

5. #2. CREATE WORK DIRECTORY
6. RUN mkdir -p /var/copy/

7. #3. MOVE TO WORK DIRECTORY
8. WORKDIR /var/copy/

9. #4. INSTALL COPY CONTAINER APPLICATION
10.RUN { "pkg-manager", "install", "copyserver" }

11. #5. RELEASE PORT THAT RECEIVES JOB INFORMATION ON CONTAINER
12.EXPOSE 20001

13. #WHEN OPERATING CONTAINER
14. #1. EXECUTE FOLLOWING PROGRAM
15.CMD { "/apps/copyserver" }

16. #WHEN TERMINATING CONTAINER
17. #1. TRANSMIT SIGTERM AND THEN NOTIFY PROGRAM
18. STOPSIGNAL SIGTERM
```

| No. | name | COOPERATIVE ACTIVATION WITH MAIN BODY | host port | cpu-shares | memory (MEMORY) | memory-swap (MEMORY +SWAP) | ... |
|---|---|---|---|---|---|---|---|
| 1 | copyserver | PERFORM | 20016 | 512 | 256mb | 256mb | ... |
| 2 | sendserver | PERFORM | 20032 | 512 | 512mb | 2048mb | ... |
| 3 | pdlserver | PERFORM | 20048 | 512 | 256mb | 1024mb | ... |
| 4 | webbrowsserver | DO NOT PERFORM | 20064 | 1024 | 128mb | 1536mb | ... |

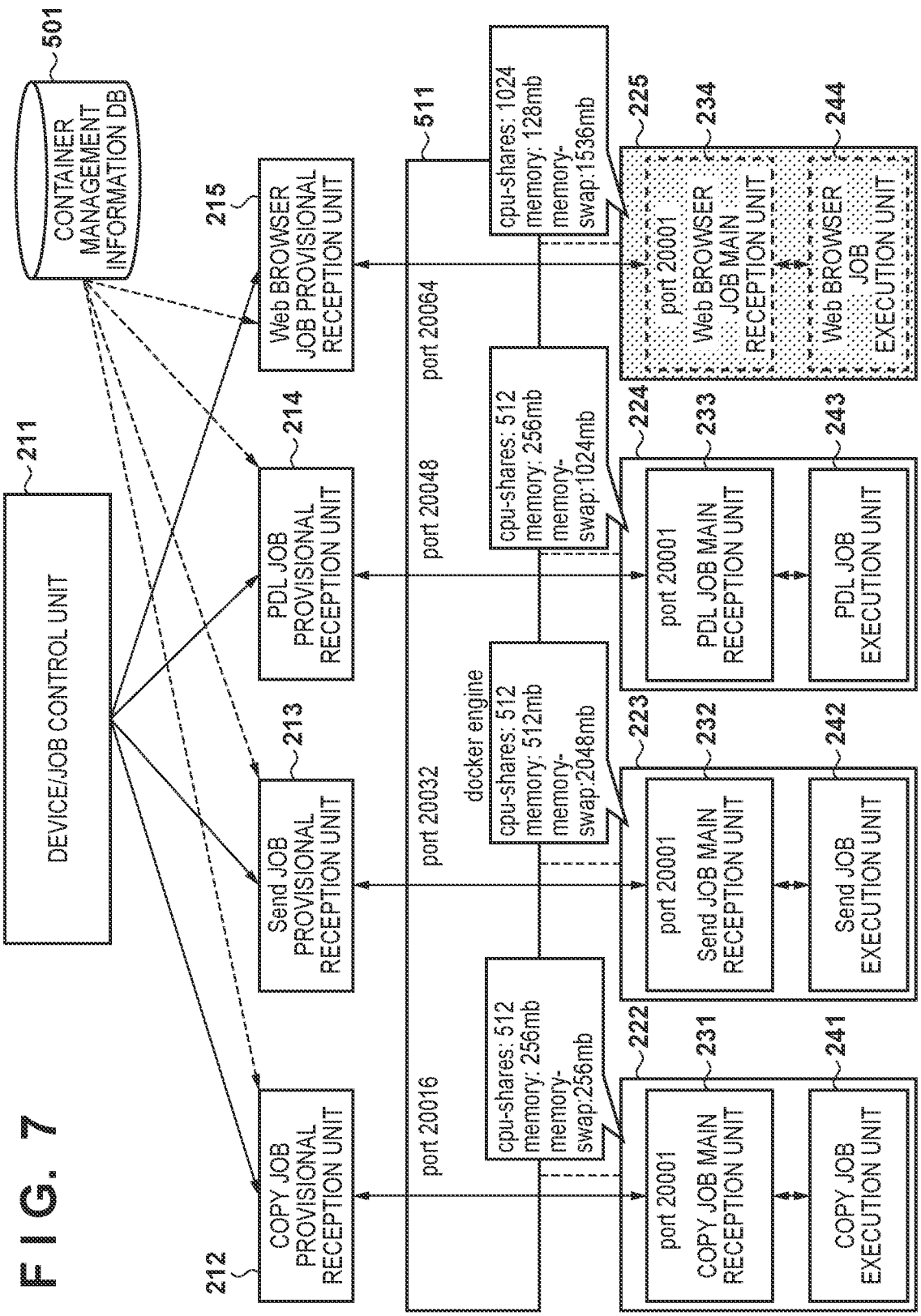

IMAGE FORMING APPARATUS THAT GENERATES A FUNCTION EXECUTION MODULE FOR AN OPERATING-SYSTEM-INDEPENDENT ENVIRONMENT

BACKGROUND OF THE INVENTION

Field of the Invention

The present invention relates to an image forming apparatus that manages, using a container technique, a resource that an application within the apparatus uses, a method of controlling the same, and a storage medium.

Description of the Related Art

As needs that are related to image forming apparatuses diversify, applications within the apparatus that are necessary are increasing. When applications within the apparatus increase in number, more hardware resources such as a CPU resource, a memory resource, and a storage resource are necessary, and as a result, hardware cost also increases. Under these circumstances, methods that, in relation to the diversifying needs, can effectively use hardware resources that are provided in an image forming apparatus are becoming necessary. In recent years, in the field of servers, techniques that effectively use hardware resources by a virtualization technique and a container technique are spreading. A virtualization technique is a technique in which a logical device is constructed on a host OS that operates on a physical device and then a guest OS for operating services and applications on the logical device is caused to operate. Meanwhile, a container technique is a technique in which some resources of a host OS that operates on a physical device are allocated to an independent execution environment (container) and then services and applications are operated. Both, by dynamically allocating hardware resources when operating the respective services and applications, aim to effectively use the limited hardware resources.

For example, in Japanese Patent Laid-Open No. 2018-129003, a technique that effectively uses hardware resources of an embedded device that uses a virtualization technique has been proposed. Particularly, a technique in which in relation to a request from a user (terminal apparatus), a user distribution unit distributes to one or more virtual machines VM (Virtual Machine), processing that is related to the corresponding request, is proposed. A virtual machine VM transitions to a standby state in advance after activation, and by transitioning to an operating state at a timing when a request is accepted, reduces the time from when the request is received to when processing is started.

However, there is a problem in the foregoing conventional technique as is described below. In order to effectively use resources in the face of a diversification of needs, is possible to consider providing a container technique in embedded devices. However, in image forming apparatuses with user interfaces, it is necessary to ensure a real-time response. For example, in the above conventional technique, an application that operates on a virtual machine VM also includes a function to provide user interfaces. In other words, even in order to simply display to a user a setting screen, a confirmation screen, and the like, it is necessary to cause a virtual machine VM to transition to an operating state and then operate an application that provides screens. Accordingly, in a case where the technique is applied to an embedded device whose resources are very limited, in the duration from when a display of a screen is requested to when it is actually displayed, there is more than a little waiting time.

SUMMARY OF THE INVENTION

The present invention enables realization of a mechanism that suitably applies a container technique to an embedded device, and in addition to effectively using hardware resources, guarantees responsiveness to user operations.

One aspect of the present invention provides an image forming apparatus that provides at least one function, the image forming apparatus comprising: at least one first module configured to accept, via a user interface, a request of respectively corresponding function; at least one second module configured to execute functions corresponding respectively to the at least one first module; a first control unit configured to notify, to a corresponding second module, a request accepted by the at least one first module; and a second control unit configured to control in accordance with the notification from the first control unit, the corresponding second module, wherein the at least one first module is activated at all times from when the image forming apparatus is activated, and the at least one second module is generated as a container of an execution environment that is independent of an operating system and whose activation state is controlled by an instruction from the second control unit.

Another aspect of the present invention provides a method of controlling at least one first module configured to accept, via a user interface, requests of respectively corresponding functions, at least one second module configured to execute functions corresponding respectively to the at least one first module, and an image forming apparatus, the method comprising: first controlling to notify, to a corresponding second module, a request accepted by the at least one first module; and second controlling to control in accordance with the notification from the first control unit, the corresponding second module, w % herein the at least one first module is activated at all times from when the image forming apparatus is activated, and the at least one second module is generated as a container of an execution environment that is independent of an operating system and whose activation state is controlled by an instruction from the second control unit.

Still another aspect of the present invention provides a non-transitory computer-readable storage medium storing a computer program for causing a computer to execute each process in a method of controlling at least one first module configured to accept, via a user interface, requests of respectively corresponding functions, at least one second module configured to execute functions corresponding respectively to the at least one first module, and an image forming apparatus, the method comprising: first controlling to notify, to a corresponding second module, a request accepted by the at least one first module; and second controlling to control in accordance with the notification from the first control unit, the corresponding second module, wherein the at least one first module is activated at all times from when the image forming apparatus is activated, and the at least one second module is generated as a container of an execution environment that is independent of an operating system and whose activation state is controlled by an instruction from the second control unit.

Further features of the present invention will become apparent from the following description of exemplary embodiments (with reference to the attached drawings).

BRIEF DESCRIPTION OF THE DRAWINGS

FIG. 3 is a view illustrating an example of a control command/control response format according to the embodiment.

FIGS. 4A and 4B are a view illustrating an example of a definition of control command and control response identifiers according to the embodiment.

FIG. 6 is a view illustrating an example of a Dockerfile 512 and a container management information DB 501 that are referenced at the time of container control according to the embodiment.

FIG. 7 is a view illustrating a flow of application control by the device/job control unit 211 according to the embodiment.

DESCRIPTION OF THE EMBODIMENTS

Figure 1:
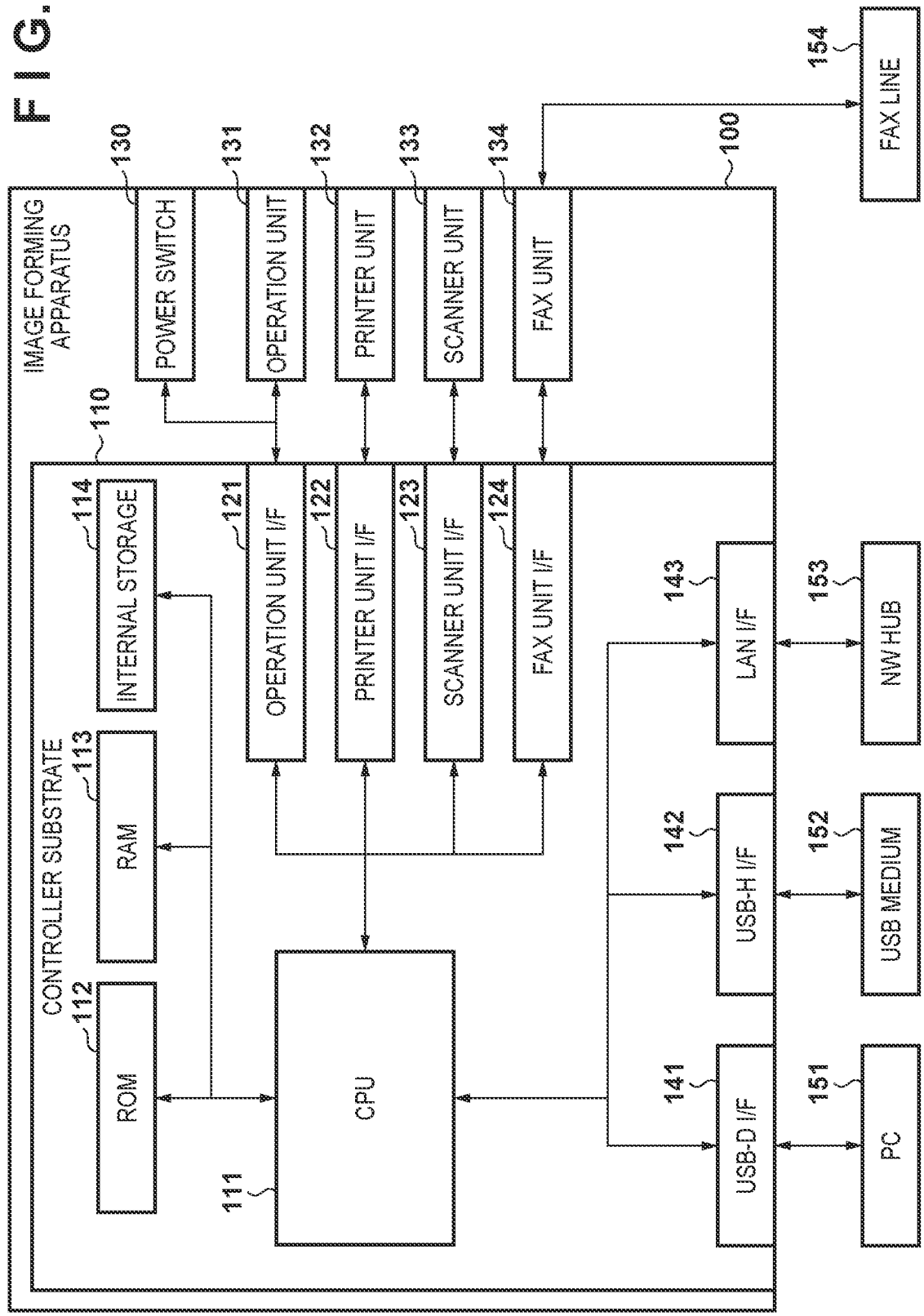
FIG. 1 is a view illustrating a hardware configuration of an image forming apparatus 100 according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Hardware Configuration of Image Forming Apparatus>

Hereinafter, an embodiment of the present invention will be described. First, a hardware configuration of an image forming apparatus 100 according to the present embodiment is described with reference to FIG. 1.

The image forming apparatus 100 is connected with a PC 151. The image forming apparatus 100, via the PC 151, can accept an operation instruction from a user. Also, the image forming apparatus 100 can connect with a USB device such as a USB medium 152 and can communicate with the connected USB device. The image forming apparatus 100 is connected with a network device such as a NW HUB 153. For example, configuration may be taken such that the image forming apparatus 100 performs direct network connection with the PC 151. Alternatively, the image forming apparatus 100 can adopt a configuration in which network connection is indirectly performed via various network devices such as a router and a switch.

The image forming apparatus 100 comprises a controller substrate 110, a power switch 130, an operation unit 131, a printer unit 132, a scanner unit 133, and a FAX unit 134. The image forming apparatus 100 has a function to perform communication with devices that are present outside the main body via the PC 151, the USB medium 152, the NW HUB 153, a FAX circuit 154, and the like. The controller substrate 110 is a controller board for controlling the image forming apparatus 100. The controller substrate 110 comprises a CPU 111, a ROM 112, a RAM 113, and an internal storage 114. Also, the controller substrate 110, in order to communicate with the units within the image forming apparatus 100 and the like, comprises an operation unit I/F 121, a printer unit I/F 122, a scanner unit I/F 123, and a FAX unit I/F 124. Additionally, the controller substrate 110, in order to communicate with what is outside the image forming apparatus 100, comprises a USB-D I/F 141, a USB-H I/F 142, and a LAN I/F 143.

The CPU 111 is a central computation processor for providing various functions of the image forming apparatus 100. The CPU 111 deploys in the RAM 113, programs and data that are related to the programs that are stored in the ROM 112 and the internal storage 114 and by executing the corresponding programs, provides to the user various functions of the image forming apparatus 100. The ROM 112 is a storage region in which is stored an initialization program that the CPU III executes when the power switch 130 is pressed and power is supplied to the controller substrate 110. The initialization program includes a series of processes for causing various devices on the controller substrate 110 such as the RAM 113 and the internal storage 114 to be described later, to be usable.

The RAM 113 is a storage region for temporarily storing programs that the CPU III executes and data that the programs use. While the speed of the RAM 113, enables faster access when compared to the internal storage 114 to be described later, its capacity is a fraction of the size of the internal storage 114. Accordingly, there are cases where the RAM 113 is used as a disk cache that temporarily stores accesses that are related to the internal storage 114. The internal storage 114 is a storage region for storing programs for the image forming apparatus 100 to provide functions, and data that the programs use. In regards to the internal storage 114, when compared to the RAM 113, while its capacity is extremely large, its access speed is a fraction of the speed of the RAM 113. Accordingly, there are cases where the internal storage 114, in a case where a memory that programs use is insufficient, is temporarily used as an alternative region (swap region) of memory.

The operation unit I/F 121 is an interface for performing communication with the power switch 130 and the operation unit 131. The printer unit I/F 122 is an interface for performing communication with the printer unit 132. The scanner unit I/F 123 is an interface for performing communication with the scanner unit 133. The FAX unit I/F 124 is an interface for performing communication with the FAX unit 134. The USB-D I/F 141 is an interface for performing communication with the PC 151. The USB-H I/F 142 is an interface for performing communication with various USB devices. In FIG. 1, an example in which connection is performed with the USB medium 152 is illustrated. The LAN I/F 143 is an interface for performing communication with external devices using a wired network. In FIG. 1, an example in which connection is performed with the NW HUB 153 and then indirect connection is performed with an external device (not shown) that is connected thereto, is illustrated.

The power switch 130 is a unit for instructing to supply power, cut off power, or the like for the image forming apparatus 100. The power switch 130 can, for example, adopt a seesaw switch. Alternatively, the power switch 130 can adopt a tactile switch. Also, configuration may be taken such that the power switch 130 is used as an event trigger for entering or returning from a power-off mode of high speed return to be described later.

The operation unit 131 is a unit for accepting instructions from the user that are related to the image forming apparatus 100 and notifying information and warnings in relation to the user. For example, configuration may be taken such that the operation unit 131 comprises an LCD panel for notifying information using images. Configuration may be taken such that the operation unit 131 comprises a buzzer for notifying information using sound. Configuration may be taken such that the operation unit 131 comprises an LED for notifying information using light. Also, configuration may be taken such that the operation unit 131 comprises a physical key or a touch panel for accepting user instructions. Additionally, configuration may be taken such that the operation unit 131 comprises a camera for accepting gesture inputs and the like.

The printer unit 132 is a unit for the image forming apparatus 100 to print information on physical sheets based on a user instruction. In implementing the present invention, in the printer unit 132, a unit that has various printing functions can be applied. In regards to the various printing functions, for example, color/monochrome printing, simplex/duplex printing, stapling/stapleless stapling, and the like are included. In the printer unit 132, output mediums to be printed are not limited to conventional sheets, and mediums such as films can be targeted. In the printer unit 132, in regards to coloring materials that are used when printing, not only toner but also ink and the like can be used. Alternatively, the present invention can be applied also in relation to an image forming apparatus that comprises a printer unit that outputs three-dimensional objects.

The scanner unit 133 is a unit for the image forming apparatus 100 to read information printed on physical sheets based on a user instruction. In implementing the present invention, in the scanner unit 133, a unit that has various reading functions can be applied. Example: Automatic duplex scanning/single-pass duplex scanning/color scanning.

The FAX unit 134 is a unit for transmitting to external devices via the FAX circuit 154, image data that the image forming apparatus 100 stored within the apparatus, based on a user instruction. Also, the FAX unit 134 is a unit for the image forming apparatus 100 to receive, via the FAX circuit 154, image data that was transmitted from external devices.

<Software Configuration>

Figure 2:
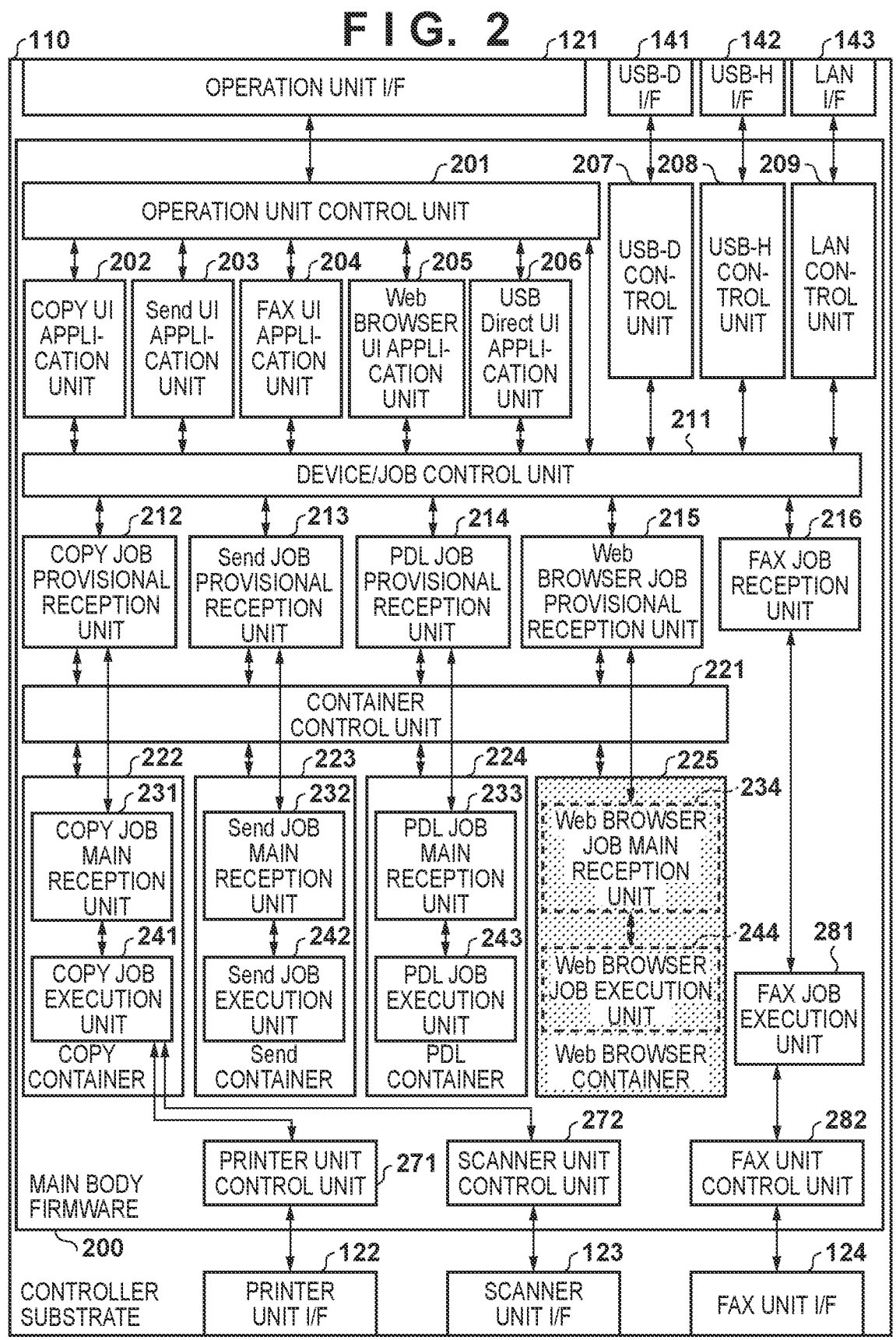
FIG. 2 is a view illustrating a software configuration of the image forming apparatus 100 according to the embodiment.

Next, a software configuration of the image forming apparatus 100 according to the present embodiment is described with reference to FIG. 2. The CPU 111 on the controller substrate 110 deploys on the RAM 113, main body firmware 200 that is stored in the internal storage 114 and executes functions in accordance with the content of the main body firmware 200.

The main body firmware 200 comprises an operation unit control unit 201, the device/job control unit 211, and a container control unit 221. Also, the main body firmware 200 comprises a USB-D control unit 207, a USB-H control unit 208, and a LAN control unit 209. The operation unit control unit 201 is a control module (first module) that performs control of UI application units 202 to 205. In the UI application units, for example, a copy UI application unit 202 for providing a copy function is included. Additionally, in the UI application units, a SendUI application unit 203, a FAXUI application unit 204, a Web browser UI application unit 205, and a USBDIRECT UI application unit 206 are included.

The copy UI application unit 202 is an application operation unit that relates to a copy function for copying, by the printer unit 132, image data that was scanned by the scanner unit 133 based on an instruction from the user via the operation unit control unit 201. The copy UI application unit 202 has a function to designate the number of copies, designate duplex printing, select presence/absence of stapling, and the like and performs display control of a setting screen that performs the settings thereof. The SendUI application unit 203 is an application operation unit that relates to a scanning function for transmitting to an external device, via the LAN control unit 209, image data that was scanned by the scanner unit 133 based on an instruction from the user. The SendUI application unit 203 has a function to designate a transmission destination and the like. The FAXUI application unit 204 is an application operation unit that relates to a FAX function for transmitting to an external device, via a FAX unit control unit 282, image data that was scanned by the scanner unit 133 based on an instruction from the user. Also, the FAXUI application unit 204, in a case where image data is transmitted in relation to the FAX unit control unit 282 from an external device, has a function to display or print by the printer unit 132, the content thereof. The Web browser UI application unit 205 is an application operation unit that relates to a function to display to the user, a Web page that was acquired from an external device via the LAN control unit 209 and accept operations in relation to content on the corresponding Web page. A USB Direct UI application unit 206 is an application operation unit that relates to a function for reading print data that is recorded in an external USB device via the USB-D control unit 207 and print by the printer unit 132 in accordance with an instruction of a user. In the present invention, configuration is taken such that the application operation units 202 to 205 can activate and operate independently from the respective application execution units 241 to 244. In other words, in the present embodiment, in regards to each of the applications that realize each of the functions that the image forming apparatus 100 provides, configuration may be taken such that the application operation units that control the UIs therefor and the execution unit for executing each of the functions are provided independently.

The device/job control unit 211 is a control module (first control unit) for controlling the entire image forming apparatus 100. In the present embodiment, the device/job control unit 211 is responsible for the role of delivering, based on an instruction from each of the UI application units 202 to 206, the instructions to each of job provisional reception units 212 to 215 and a FAX job reception unit 216, and the like. Also, in the present embodiment, the device/job control unit 211 can also accept instructions from the PC 151 via the USB-D control unit 207 and the USB-D I/F 141. Additionally, in the present embodiment, the device/job control unit 211 can also accept instructions from an external device (not shown) such as the NW HUB 153 via the LAN control unit 209 and the LAN I/F 143. Note that there are cases in which the device/job control unit 211 delivers, to the job reception units, instructions in relation to applications that are not containerized. For example, processing that is related to a FAX is delivered to the FAX job reception unit 216. The FAX job reception unit 216 delivers instructions to a FAX job execution unit 281 and then executes them. Because the FAX job reception unit 216, in regards to the processing that is related to the transmission/reception of a FAX, is required to constantly operate when the image forming apparatus 100 is operating, a form is taken so as not to operate in a container but to operate directly. Accordingly, by virtue of the present embodiment, rather than applying the container technique uniformly in relation to all the function applications, it is applied in accordance with the characteristics of the functions that the image forming apparatus 100 provides.

The container control unit 221 is a control module (second control unit) that performs control of containers 222 to 225 (second module). For example, the main body firmware 200 comprises a copy container 222 for executing a copy function. The copy container 222 is generated as a container (second module) of an execution environment that is independent from an operating system of the image forming apparatus 100 and comprises a copy job main reception unit 231 for accepting instructions from a copy job provisional reception unit 212 and a copy job execution unit 241 for executing the accepted instructions. The copy job execution unit 241 performs printing instructions to the printer unit 132 via a printer unit control unit 271 and the printer unit I/F 122. Similarly, the copy job execution unit 241 performs image scan instructions to the scanner unit 133 via a scanner unit control unit 272 and the scanner unit I/F 123.

Also, the main body firmware 200 comprises a Send container 223 for executing a Send function, a PDL container 224 for executing a PDL function, and a Web browser container 225 for execute a Web browser function. The Send container 223 comprises a Send job main reception unit 232 for accepting instructions from a Send job provisional reception unit 213 and a Send job execution unit 242 for executing the accepted instructions. The PDL container 224 comprises a PDL job main reception unit 233 for accepting instructions from a PDL job provisional reception unit 214 and a PDL job execution unit 243 for executing the accepted instructions. The Web browser container 225 comprises a Web browser job main reception unit 234 for accepting instructions from a Web browser job provisional reception unit 215 and a Web browser job execution unit 244 for executing the accepted instructions.

Also, the main body firmware 200 comprises the printer unit control unit 271, the scanner unit control unit 272, and the FAX unit control unit 282. These are modules for controlling the respective units.

<Control Commands/Control Responses>

Next, with reference to FIG. 3, an example of a control command/control response format according to the embodiment will be described. In the present embodiment, for the sake of descriptive convenience, control commands that indicate requests that execute control and control responses that indicate results of having executed control, which circulate inside/outside of the main body, are expressed in the same format. However, there is no intention to limit the present invention, and, in regards to the format and content of the corresponding control commands/control responses, various kinds of content can be adopted. Note that in the present embodiment, in regards to the control commands/control responses, it is assumed that data is positioned in accordance with the order of network byte order.

A control command version that is positioned starting at +0h indicates the version of the control command and the control response of the corresponding data. Here, it is assumed to be 0xC0CaFF01. This can be used to determine whether the control command that the image forming apparatus 100 received is of a supported version.

A control command/control response identifier that is positioned starting at +4h is an identifier that indicates the content of the present control command/control response. Both the control command identifier/control response identifier are expressed by a maximum of 32-bits of data. Note that in the present embodiment, taking future extensibility into account, high-order 16 bits/2 bytes are set as a reserve, and data that is expressed by low-order 16 bits/2 bytes are used. The control command identifiers/control response identifiers are described in detail with reference to FIGS. 4A and 4B.

A user identifier that is positioned starting at +8h is an identifier that indicates a transmission/reception destination to receive the control response which is the result of having the corresponding control command transmitted. For example, the user identifier is an identifier that can identify which application or module inside/outside the device, an application or module is.

A unique data length of the control command/control response that is positioned starting at +10h and a unique data body portion of the control command/control response that is positioned starting at +18h are information for expressing information that cannot be fully expressed by the control command/control response identifier. Because control commands are used for various purposes and intended uses, it is difficult to define a format that is usable commonly across all the control commands/control responses. Accordingly, in the present embodiment, a form is taken so as to deliver the data length and the body portion (content) that can deliver unique data of the corresponding control command/control response based on the control command identifier.

<Control Command>

Hereinafter, various control commands that the device/job control unit 211 handle will be described with reference to FIG. 4A to FIG. 7. First, with reference to FIGS. 4A and 4B, an example of a control command/control response identifier definition according to the embodiment will be described. The control command identifier includes a low-order byte that expresses a target option for identifying a module to be a target and a high-order byte that expresses a control command type for identifying what kind of an instruction to give in relation to the corresponding target module.

(Target Option)

A target option is information that expresses each of the applications that are instruction targets. For example CC-TARGET_COPY (0x10) is allocated to instructions that are related to a copy application. For example, CC_TARGET_SEND (0x20) is allocated to instructions that are related to a send application. CC_TARGET_PDL (0x30) is allocated to instructions that are related to a PDL application. CC_TARGET_WEBBROW (0x40) is allocated to a web browser application. CC_TARGET_FAX (0x50) is allocated to a FAX application. In the present embodiment, on the image forming apparatus 100, in addition to these pre-installed applications, it is possible to target applications that the user optionally installed. For example, in the present embodiment, a range within 0x80 to 0xFE is allocated for user applications, and a desired numerical value can be allocated at the timing of installation. Additionally, in relation to instructions for a device main body, CC_TARGET_DEVICE (0xFF) is allocated. Also, it is possible to extend target options so as to instruct external options such as a feeder that are comprised by the device.

Control command types include control command identifiers that are related to the reception units, control command identifiers that are related to the containers, control command identifiers that are related to the applications, and control command identifiers that are related to the device. Also, the control response identifiers are divided into a general-purpose control response identifier and a container state control response identifier.

(Reception Unit Control Command)

The control command identifiers that are related to the reception units start from 0xF0 to 0xFF. In the present embodiment, a reception unit activation instruction (CC_RECEPTOR_CMD_START, 0xF000) indicates an activation instruction that is related to the reception unit. For example, a command identifier 0xF010, due to being an OR of CC-TARGET_COPY and CC_RECEPTOR_CMD_START, is a control command identifier that indicates activation of the reception unit of the copy application.

(Container Control Commands)

Figure 5:
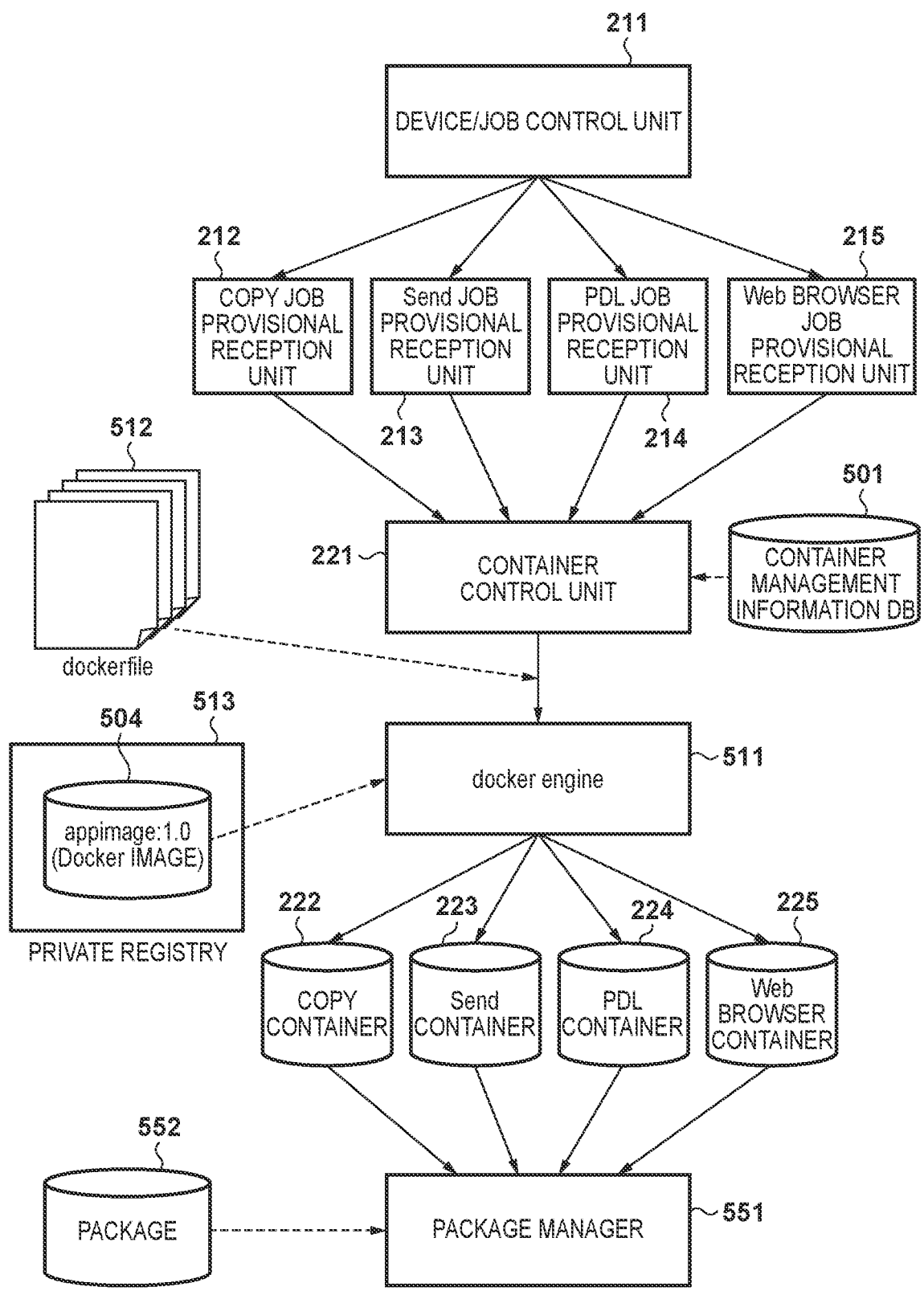
FIG. 5 is a view illustrating a flow of container control by a device/job control unit 211 according to the embodiment.

The control command identifiers that are related to containers start from 0xC0 to 0xCF. The details thereof will be described with reference to FIG. 5 and FIG. 6. With reference to FIG. 5, a flow of container control by the device/job control unit 211 will be described. In the present embodiment, an example in which a Docker® library is adopted as a container control library will be described. Note that a configuration illustrated in FIG. 5 is something that illustrates a part of the software configuration (FIG. 2) that is included in the image forming apparatus 100 according to the present embodiment and configurations that are not related to the following description are omitted.

A case in which a control command whose control command identifier is 0xC010 is transmitted in relation to the device/job control unit 211 from the inside/outside of the device will be described. The device/job control unit 211, due to the low-order byte that expresses the target option of the corresponding the control command identifier being 0x10, determines that a control command related to the copy application was received. Then, the device/job control unit 211 notifies the corresponding control command to the copy job provisional reception unit 212. The copy job provisional reception unit 212, due to the corresponding control command identifier starting from 0xC0, determines that the control command performs a container generation instruction and notifies the corresponding control command to the container control unit 221.

The container control unit 221 determines from the control command identifier, that it is the container generation instruction is related to the copy application. The container control unit 221 references the corresponding container management information DB 501, selects a corresponding Dockerfile from among the Dockerfile 512, and then performs a container generation instruction in relation to a Docker engine 511. As a result, the Docker engine 511 generates the copy container 222.

Here, supplemental explanation will be given for the Dockerfile 512 and the container management information DB 501 that are used in the present embodiment with reference to FIG. 6. FIG. 6 is an example of container management information 60 that is stored in the Dockerfile 512 that is referenced at the time of container control and the container management information DB 501. The Dockerfile 512 that is illustrated in FIG. 6 is a Dockerfile that defines a container for the copy application. The lines that start with "#" are comment lines for facilitating description.

FROM in line 4 indicates that a Docker image for when generating a container is appimage: 1.0 (504) on a private registry 513. In the present embodiment, description is given assuming that a Docker image to be a base of each container is held within the image forming apparatus 100. Note that in an embodiment of the present invention, such limitation is not made, and for example, configuration may be taken so as to reference a registry of another image forming apparatus or to reference a publicized public registry.

RUN in line 6 indicates generating a work directory, /var/copy, as a command to execute when generating a container. Also, WORKDIR in line 8 indicates moving the work directory to /var/copy as a command to execute when generating a container. RUN in line 10 indicates executing a pkg-manager command as a command to execute when generating a container, together with arguments, "install" and "copyserver". By the pkg-manager command being executed on the copy container 222 by this, a copyserver application is installed on a package repository 552 via a package manager 551. Note that it is possible to implement each container as an independent storage, and it is also possible to express each container using a file system where only differences in an update from a base image are recorded and those are expressed transparently, for example.

EXPOSE in line 12 indicates that a port number that is released for receiving a control command on a container is 20001. CMD in line 15 indicates executing "/apps/copyserver" when the container is operated. STOPSIGNAL in line 18 indicates notifying a signal. SIGTERM, to a program that is activated by CMD when a container is ended. By this, the program can detect the end of the container.

Although the description of Dockerfile was given here using an example of the copy container 222 for the copy application, the same applies to other applications and containers. For the sake of descriptive convenience, description will be omitted for other applications.

A reference numeral 600 is container management information that is managed by the container management information DB 501. Here, for descriptive convenience, the name DB, in other words, database, is used. If the information related to the corresponding containers can be managed thereby, configuration may be taken so as to manage the corresponding information using something other than a relational database. For example, it is possible to use a simple text file as a management format. A reference numeral 601 indicates a management number of each container management information. A reference numeral 602 indicates names of containers. A reference numeral 603 indicates whether or not to perform cooperative activation with a main body. Cooperative activation with a main body indicates generating and activating a container in cooperation with the image forming apparatus 100 (main body). Note that configuration may be taken such that containers besides that of the cooperative activation with a main body are generated at various timings. For example, configuration may be taken such that when setting of the corresponding function is started via a user interface, the corresponding container is generated and then activated. Also, configuration may be taken such that when it is sensed that a sheet is placed on a tray (not shown) of the image forming apparatus 100, a container that corresponds to at least one function whose execution is predicted, is generated and then activated. In such a case, for example, configuration may be taken such that at least one container that relates to a copy function, a scanning function, and a FAX function is generated and then activated. Additionally, in a case where the image forming apparatus 100 comprises a human detection sensor (not shown), configuration may be taken so that w % ben a person is sensed by the human detection sensor in a predetermined range from the image forming apparatus 100, a container that corresponds to at least one function whose execution is predicted, is generated and then activated. A reference numeral 604 indicates which port a host side that is operating the docker will use for control command communication. A reference numeral 605 indicates the degree of priority of CPU resource allocation between containers. A reference numeral 606 indicates a maximum value of memory resource allocation. A reference numeral 607 indicates a maximum value of memory resource allocation that includes a swap memory.

A reference numeral 610 indicates container management information (information that is related to the copy container 222) of the copy application. As illustrated by the reference numeral 610, the name 602 of the copy container 222 is "copyserver". Also, because in the copy container 222, the cooperative activation with a main body is set to "perform", the copy container 222 activates at the same time, at the timing that the image forming apparatus 100 is powered on. Note that, although the copy function, the Send function, and the PDL function are set here to perform the cooperative activation with a main body, there is no intention to limit the present invention. It is a setting that can be changed in accordance with the use environment of the corresponding image forming apparatus or the intention of an administrator. In regards to a host port 604 of the copy container 222, a port 20016 is allocated. Cpu-shares 605 of the copy container 222 is set to 512. A memory 606 of the copy container 222 is set to 256 MB, in other words, indicates that up to 256 MB can be used. A memory swap 607 of the copy container 222 is set to 256 MB, in other words, indicates that up to 256 MB of memory including swap memory can be used. In other words, because there is no difference from the memory 606, it is assumed that a swap memory will not be used. For example, if this value is 1280 MB, it indicates that a swap file can be used up to 1024 MB which is the difference from 256 MB. Similarly, in regards to the Send application, the PDL application, and the Web browser application, each container management information is managed on the corresponding container management information DB 501. Accordingly, in the container management information 600, for each container, information that is related to hardware resource (host port, CPU usage, memory, and memory swap) allocation is included.

Description will return to that of FIG. 5. In the container control that the container control unit 221 performs in relation to the docker engine 511, a container generation instruction, a container activation instruction, and a container stop instruction are included. Additionally, in the container control, a container return instruction, a container setting change instruction, a container termination instruction, a container discard instruction, and a container state acquisition instruction are included.

The container generation instruction (CC_CONTAINER_CMD_CREATE, 0xC000) is an instruction to generate a container based on the Dockerfile 512 and the container management information 600 described above. The container activation instruction (CC_CONTAINER_CMD_START, 0xC100) is an instruction to activate an application on a container. The container stop instruction (CC_CONTAINER_CMD_PAUSE, 0xC200) is an instruction to pause a container from an activation state to a stopped state. The above container stop instruction is performed, for example, in a case where the user who is currently logged in logs out or in a case where after a job of a corresponding function has ended, a certain amount of time has elapsed without a job of the same function being inputted. Additionally, the container stop instruction is also performed in a case where hardware resources fall below a predetermined value when activating another container and at that timing, the use frequency is low; in a case where a fatal error has occurred; and the like. A container return instruction (CC_CONTAINER_CMD_UNPAUSE, 0xC300) is an instruction to cause a paused container to be in an active state again. Also, configuration may be taken so as to pause at least one container when the apparatus transitions to a power saving mode or a sleep mode. The container return instruction will be, in general, at a timing when a request to execute a function in relation to a container in a stopped state is accepted or at a time of return from a power saving mode of the apparatus and the like. A container setting change (CC_CONTAINER_CMD_UPDATE, 0xC700) is an instruction to change a setting of resources such as a CPU resource and memory resource to allocate to the container. A container termination instruction (CC_CONTAINER_CMD_STOP, 0xCD00) is an instruction to end an application on a container. A container discard instruction (CC_CONTAINER_CMD_REMOVE, 0xCE00) is an instruction to discard a container. The container discard instruction is, for example, performed in a case where after a job was executed in a non-resident container, the corresponding container is discarded. The container state acquisition instruction (CC_CONTAINER_CMD_GET_STATUS, 0xCF00) is an instruction to acquire the state of a container.

(Application Control Command)

As illustrated in FIGS. 4A and 4B, a control command identifier that is related to an application starts from 0xA0 to 0xAF. An application control command that is related to an application by the device/job control unit 211 according to the present embodiment will be described with reference to FIG. 7. Hereinafter, description will be given using an example of a case where a control command whose control command identifier is 0xA110 was transmitted in relation to the device/job control unit 211 from the inside/outside of the device. The device/job control unit 211, due to the low-order byte that expresses the target option of the corresponding the control command identifier being 0x10, determines that a control command related to the copy application was received. Then, the device/job control unit 211 notifies the corresponding control command to the copy job provisional reception unit 212. The copy job provisional reception unit 212 detects that the corresponding control command identifier starts from 0xA1, determines that the control command performs an application execution instruction, and then notifies the corresponding control command in relation to the copy job main reception unit 231.

Note that at this time, the copy job provisional reception unit 212, by referencing management information 610 that is related to the copy container 222 of the container management information DB 501, recognizes that the port for control command communication that was allocated to the copy application is 20016. Then, the copy job provisional reception unit 212 transmits the control command in relation to the port 20016. The docker engine 511 accepts the communication that is related to the port 20016 and further transmits it to a port 20001 in relation to the copy container 222. The copy job main reception unit 231 reads the control command that was transmitted to the port 20001 and by notifying the copy job execution unit 241, a copy job is executed. The respective containers 222 to 225 are operating in accordance with the resource allocation that was described in the container management information 600 of the container management information DB 501.

Note that, in the present invention, the image forming apparatus 100 does not need to simultaneously and continuously operate all the containers. For example, in the present embodiment, the Web browser container 225 is activated at a timing that the user clearly indicates an intention to use, for example, a timing at which the Web browser UI application unit 205 is operated. Also, in the present embodiment, as cooperative activation with a main body, configuration may be taken so as to, in accordance with a user setting, not continuously operate even for the applications that are continuously operated. In such a case, similarly to the above Web browser, a corresponding container is activated at a timing at which the user clearly indicates an intention to use.

Description will return to that of FIG. 5. Application instructions that each of the provisional reception unit 212 to 215 performs in relation to each of the main reception units 231 to 234 include an execution instruction, a pause instruction, a cache memory flash request instruction, and a cancellation instruction. The execution instruction (CC_APPLICATION_CMD_EXECUTE, 0xA100) is an instruction to execute a job in a corresponding application. The pause instruction (CC_APPLICATION_CMD_STOP, 0xA500) is an instruction to pause a job that is being executed in an application. The cache memory flash request instruction (CC_APPLICATION_CMD_C_FLUSH, 0xA700) is an instruction to discard cache on a memory that was stored during application execution. By this, it becomes possible to reduce the amount of memory that an application uses. The cancel instruction (CC_APPLICATION_CMD_CANCEL, 0xAF00) is an instruction to cancel a job that is being executed in an application.

(Device Control Command)

As illustrated in FIGS. 4A and 4B, a control command identifier that is related to a device starts from 0XD0 to 0xDF. In a device control command, it is possible to include a control command for accepting an instruction such as device power control from the inside/outside of the device, for example. Device control command identifiers include a sleep return instruction, a sleep entry instruction, a panel-on instruction, a panel-off instruction, a high speed return power-off instruction, and a power-off instruction.

The sleep entry instruction (CC_DEVICE_CMD_SLEEP, 0xD000) is an instruction to transition the state of the device to a power saving mode which reduces power consumption. The sleep return instruction (CC_DEVICE_CMD_WAKEUP, 0xD100) is an instruction to transition the state of the device from the power saving mode to a normal mode. The panel-off instruction (CC_DEVICE_CMD__PANELOFF, 0xD200) is an instruction to stop displaying an operation panel screen that is comprised by the operation unit 131. The panel-on instruction (CC_DEVICE_CMD__PANELON, 0xD300) is an instruction to execute display of an operation panel screen that is comprised by the operation unit 131. The high speed return power-off instruction (CC_DEVICE_CMD_QUICKOFF, 0xD400) is an instruction to transition the state of the device from the high speed return power-off mode to a normal mode. In a case where the image forming apparatus 100 enters the high speed return power-off mode, the image forming apparatus 100 can return to a normal mode only by the operation of the power switch 130. The power-off instruction (CC_DEVICE_CMD__POWEROFF, 0xDF00) is an instruction to cut the power of the device.

Note that in the image forming apparatus 100 according to the present embodiment, by controlling in detail, the power of the printer unit 132, the scanner unit 133, the FAX unit 134, and the like, power consumption of the entire image forming apparatus 100 is reduced. For example, it is possible to perform contrivance such as comprising in relation to the printer unit 132, two types of modes whose amounts of power consumption during a stand-by state are different, and use different modes in accordance with the instruction from the main body firmware 200. In the present embodiment, because such power control of the device is the same processing as power control in a conventional image forming apparatus, detailed description will be omitted.

(General-Purpose Control Response Identifier)

As illustrated in FIGS. 4A and 4B, in the general-purpose control response identifier, a successful response identifier (CC_RESPONSE_OK, 0x0000) and a failed response identifier (CC_RESPONSE_NG, 0x0001) are included. These are used for notifying whether for not the processing that is related to various control commands were successful or unsuccessful.

(Container State Control Response Identifier)

As illustrated in FIGS. 4A and 4B, the container state control response identifier includes a container non-existing state control response, a container non-activation state control response, a container activation state response, a container stopped state response. Additionally, in the container state control response identifier, a container reactivation in progress response, a container termination in progress response, a container deletion in progress response, and a container stop failure in progress response are included.

The container non-existing state control response (CC_RESPONSE_NONEXISTS, 0x8000) indicates a state in which a container for operating a target application does not exist. The container non-activation state control response (CC_RESPONSE_CREATED, 0x0000) indicates that although a target container exists, it is in a state in which it is not active. The container activation state response (CC_RESPONSE_RUNNING, 0x0001) indicates that a target container exists, and it is in a state in which it is active. The container stopped state response (CC_RESPONSE_PAUSED, 0x0002) indicates that although a target container exists and is active, a stop instruction was accepted. The container reactivation in progress response (CC_RESPONSE_RESTARTING, 0x0003) indicates that a reactivation request that is related to a container is being executed. The container termination in progress response (CC_RESPONSE_EXITED, 0x0004) indicates that a container is in a terminated state. The container deletion in progress response (CC_RESPONSE_REMOVING, 0x0005) indicates that a deletion request that is related to a container is being executed. The container stop failure in progress response (CC_RESPONSE_DEAD, 0x0006) indicates that although a target container exists and is active, but the state is such that stop processing in relation to a stop instruction request has failed.

<Processing Procedure of Device/Job Control Unit>

Figure 8A:
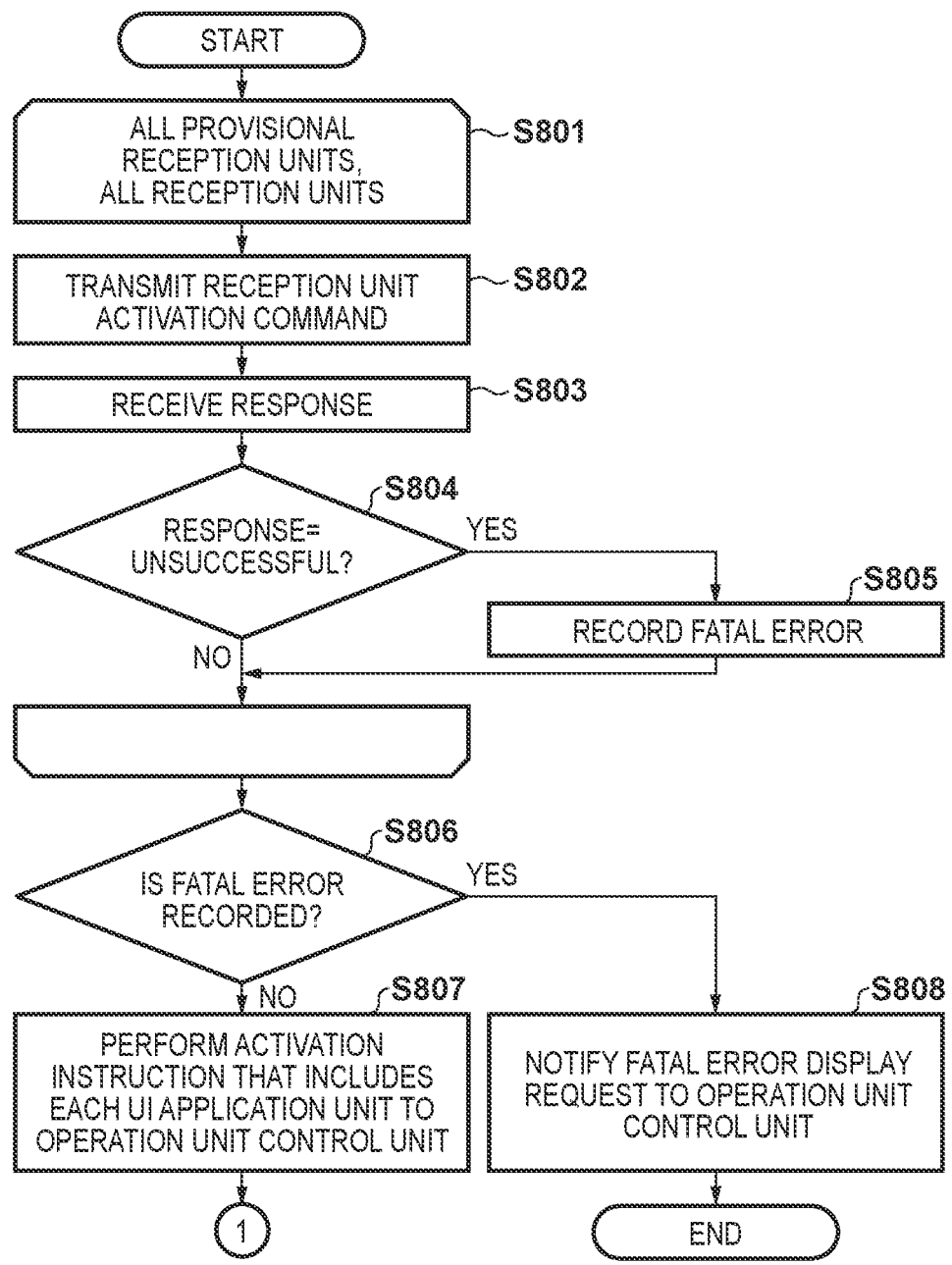
FIGS. 8A and 8B are a flowchart of the device/job control unit 211 according to the embodiment.
Figure 8B:
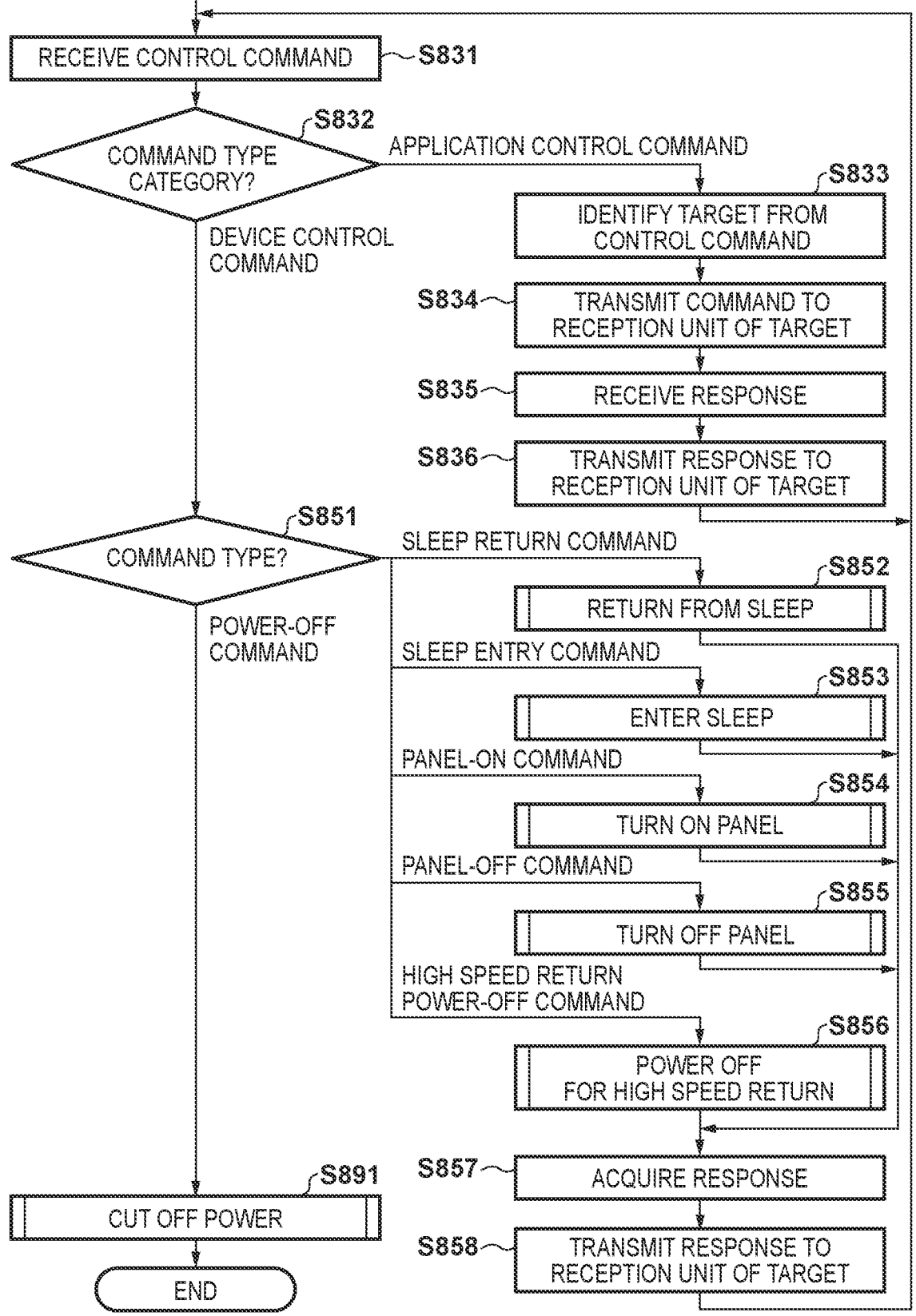

Next, a processing procedure of the device/job control unit 211 according to the present embodiment will be described with reference to FIGS. 8A and 8B. The processing to be described below is realized, for example, by the CPU 111 reading out to the RAM 113 and then executing, a control program that is stored in the ROM 112 and the internal storage 114.

Step S801 indicates loop processing, and the device/job control unit 211 repeatedly executes processing of the following steps S802 to S805 in relation to all of the provisional reception units 212 to 215 and the reception unit 216. In step S802, the device/job control unit 211 transmits a reception unit activation command in relation to the respective reception units. Next, in step S803, the device/job control unit 211 receives a response from the respective reception units. In step S804, the device/job control unit 211 determines whether the responses are unsuccessful. In a case where they are unsuccessful, the processing advances to step S805, and the device/job control unit 211 records that a fatal error has occurred and continues the repeating processing.

Meanwhile, in a case where they are not unsuccessful, the repeating processing is continued as is. By repeating the processing of the above steps S802 to S805, the device/job control unit 211 performs an activation instruction in relation to all of the provisional reception units 212 to 215 and the reception unit 216. When all of the processing is ended, the processing advances to step S806.

In step S806, the device/job control unit 211 determines whether or not a fatal error has occurred, and in a case w % here a fatal error has occurred, advances to step S808 and otherwise, advances to step S807. In step S808, the device/job control unit 211 notifies in relation to the operation unit control unit 201, an error display request that is associated with the occurrence of a fatal error and then ends the processing. Meanwhile, in step S807, the device/job control unit 211, in a case where a fatal error did not occur, performs an activation instruction in relation to the operation unit control unit 201. The operation unit control unit 201, upon receiving the corresponding activation instruction, performs activation of the UI application units 202 to 206 and then advances to step S831. Note that it is desirable for the UI application units 202 to 206, in order to facilitate updating of programs, to be realized in a form of an external program that is called from the operation unit control unit 201.

In step S831, the device/job control unit 211 receives a command that was transmitted from the inside/outside of the device. Then, in step S832, the device/job control unit 211 divides the processing in accordance with the type of the received command. If the type of the received command is an application control command, the processing advances to step S833, and the device/job control unit 211 identifies a target application from the corresponding control command. Next, in step S834, the device/job control unit 211 transmits the corresponding control command in relation to the provisional reception unit or the reception unit of the target application. In the provisional reception unit or the reception unit, as described later, processing that is related to the corresponding command is performed, and then the provisional reception unit or the reception unit transmits a control response. In step S835, the device/job control unit 211 receives the response from the target application. Then, in step S836, the device/job control unit 211 transmits the corresponding received response in relation to a transmission origin that is recorded in the user identifier of the control command received in step S831.

Meanwhile, if it is determined that the type of the command received in step S832 is a device control command, the processing advances to step S851 and the device/job control unit 211 divides the processing in accordance with the type of the command. If the type of the command is a sleep return command, the processing advances to step S852 and the device/job control unit 211 executes the sleep return processing. Similarly, in steps S853 to S856, the device/job control unit 211 executes the respective processes in relation to a sleep entry command, a panel-on command, a panel-off command, or a high speed return power-off command. Then, in step S857, the device/job control unit 211 acquires as a response, the result of executing these commands. Then, in step S858, the device/job control unit 211 transmits the response after the device control is performed, in relation to a transmission origin that is recorded in the user identifier of the control command received in step S831. Then, the device/job control unit 211, in order to receive a new command, returns the processing to step S831.

Also, if it is determined in step S851 that the type of a command is a power-off command, the processing advances to step S891 and the device/job control unit 211 executes the power-off processing and then ends the processing. As a result, the image forming apparatus 100 enters a complete power-off state.

By the above control, the device/job control unit 211, for a received control command, in accordance with a target that is included in the control command, can forward the control command in relation to the provisional reception unit/the reception unit of an application, can control the device, or the like.

<Processing Procedure of Provisional Reception Units>

Figure 9A:
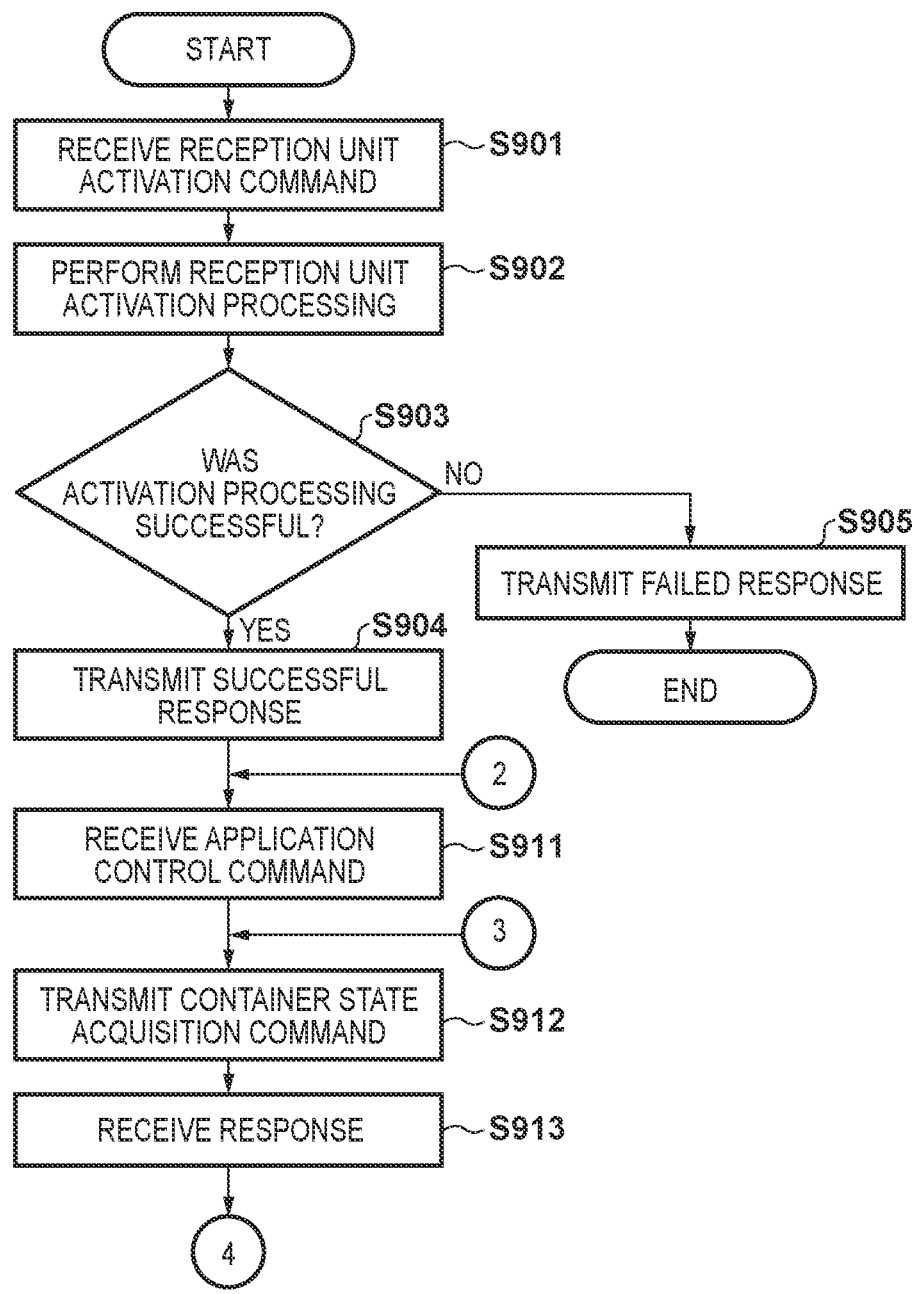
FIGS. 9A and 9B are a flowchart of provisional reception units 212 to 215 according to the embodiment.
Figure 9B:
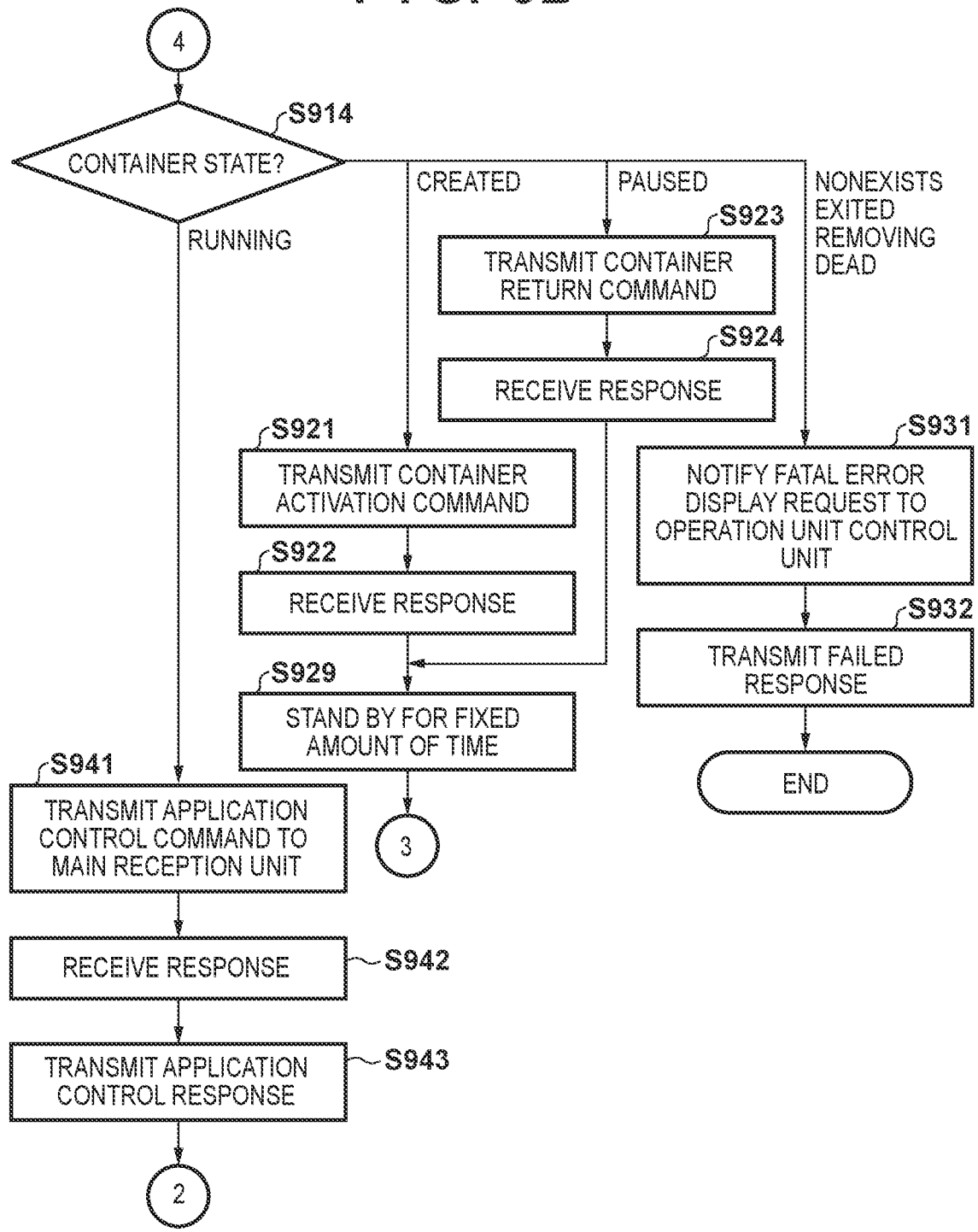

Next, a processing procedure of the provisional reception units 212 to 215 according to the present embodiment will be described with reference to FIGS. 9A and 9B. Here, description will be given using the copy job provisional reception unit 212 as representative. Also, in regards to other provisional reception units 213 to 215, because they behave in the same manner as the copy job provisional reception unit 212, description will be omitted. The processing to be described below is realized, for example, by the CPU 111 reading out to the RAM 113 and then executing, a control program that is stored in the ROM 112 and the internal storage 114.

In step S901, the copy job provisional reception unit 212 receives a provisional reception unit activation command from the device/job control unit 211. Next, in step S902, the copy job provisional reception unit 212 executes the activation processing of the provisional reception unit. For example, in the activation processing of the provisional reception unit, a memory is ensured in advance or related hardware is set. Then, in step S903, the copy job provisional reception unit 212 determines whether the activation processing was successful. In a case where the activation processing was successful, the processing advances to step S904 and the copy job provisional reception unit 212 notifies a successful response to the device/job control unit 211 and thereafter, in order to repeat the processing that is related to the application control command, advances the processing to step S911. Meanwhile, in a case where the activation processing is unsuccessful, the processing advances to step S905 and the copy job provisional reception unit 212 notifies a failed response to the device/job control unit 211 and then ends the processing.

In step S911, the copy job provisional reception unit 212 receives an application control command from the device/job control unit 211. Next, in step S912, in order to execute the application control command received in step S911, the copy job provisional reception unit 212 transmits a container state acquisition command in relation to the container control unit 221. Additionally, in step S913, the copy job provisional reception unit 212 acquires a container state control response from the container control unit 221.

Next, in step S914, the copy job provisional reception unit 212 switches the processing in accordance with the received container state. In a case where the container state is a container non-activation state (CC_RESPONSE_CREATED), the processing advances to step S921 and the copy job provisional reception unit 212 transmits a container activation command (CC_CONTAINER_CMD_START) to the container control unit 221. Next, in step S922, the copy job provisional reception unit 212 receives a container activation command response from the container control unit 221. By the above, a container for operating the corresponding application transitions to a container activation state (CC_RESPONSE_RUNNING). Then, the processing advances to step S929 and the copy job provisional reception unit 212, after standing by for a fixed amount of time, returns the processing to step S912 in order to repeat the container state acquisition processing again.

In a case where the container state was a container stopped state (CC_RESPONSE_PAUSED) in step S914, the processing advances to step S923. In step S923, the copy job provisional reception unit 212 transmits a container return command (CC_CONTAINER_CMD_UNPAUSE) in relation to the container control unit 221. Next, in step S924, the copy job provisional reception unit 212 receives a response to the container return command from the container control unit 221. By the above, a container for operating the corresponding application transitions to a container activation state (CC_RESPONSE_RUNNING). Then, the processing advances to step S929 and the copy job provisional reception unit 212, after standing by for a fixed amount of time, returns the processing to step S912 in order to repeat the container state acquisition processing again.

In a case where the container state was a container operating state (CC_RESPONSE_RUNNING) in step S914, the processing advances to step S941. In step S941, the copy job provisional reception unit 212 transmits the application control command received in step S911 in relation to the copy job main reception unit 231. Next, in step S942, the copy job provisional reception unit 212 receives a response to the application control command from the copy job main reception unit 231. Additionally, in step S943, the copy job provisional reception unit 212 transmits the response received in step S942 to the transmission origin of the application control command received in step S911 and returns the processing to step S911.

In a case where the container state in step S914 is a state other than the above, the processing advances to step S931 and the copy job provisional reception unit 212 notifies a fatal error to the operation unit control unit 201. Additionally, in step S932, the copy job provisional reception unit 212 transmits the failed response to the transmission origin of the application control command received in step S911 and ends the processing.

By the above control, the copy job provisional reception unit 212, irrespective of the state of the copy container 222, can accept an application control command that is related to a copy job at all times. Additionally, the copy job provisional reception unit 212, by transmitting to the container control unit 221, a container activation command or a container return command that is related to the copy container 222, can prepare a container environment for executing the received application control command.

<Processing Procedure of Container Control Unit>

Figure 10A:
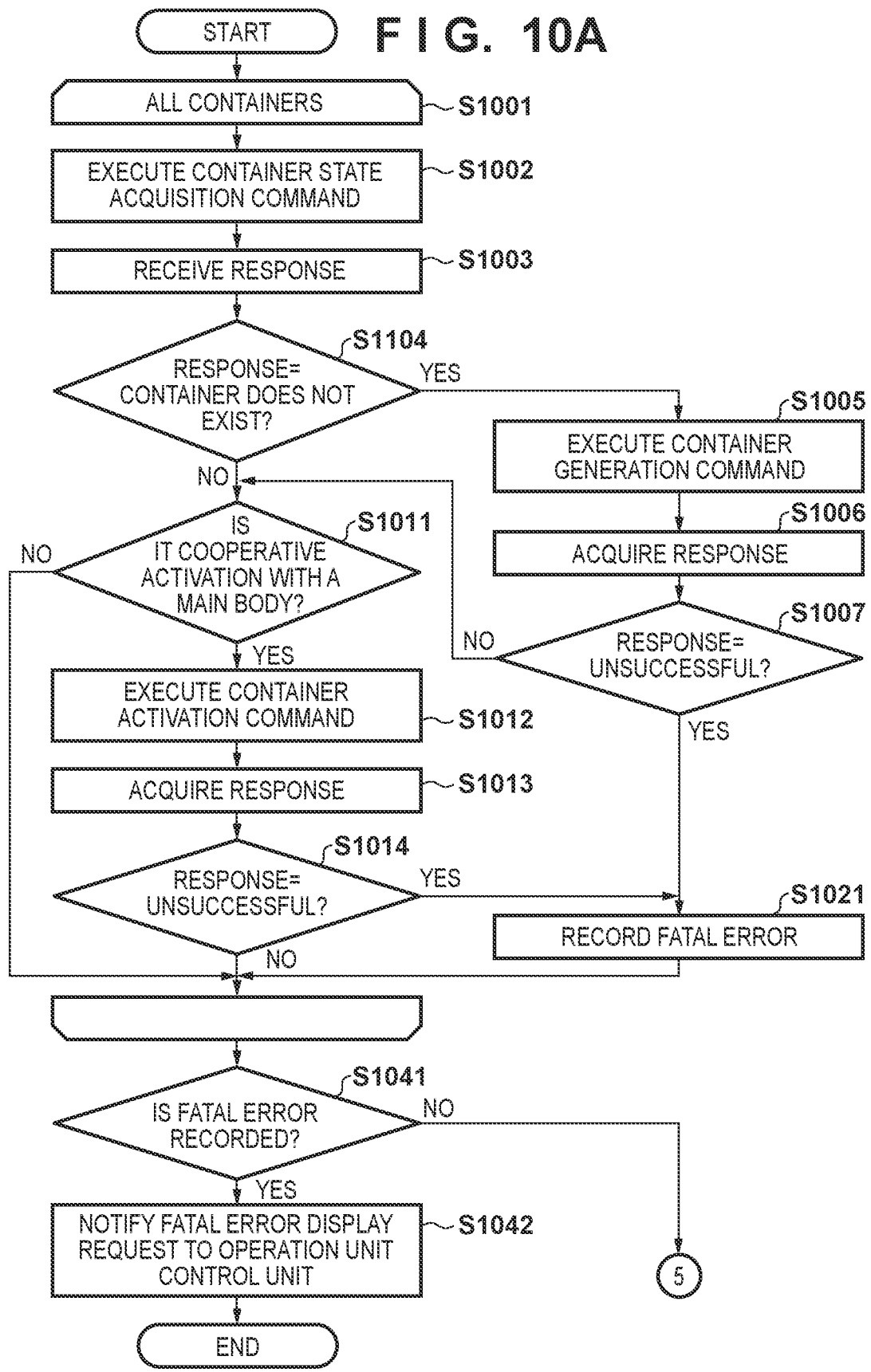
FIGS. 10A-10C are a flowchart of a container control unit 221 according to the embodiment.
Figure 10B:
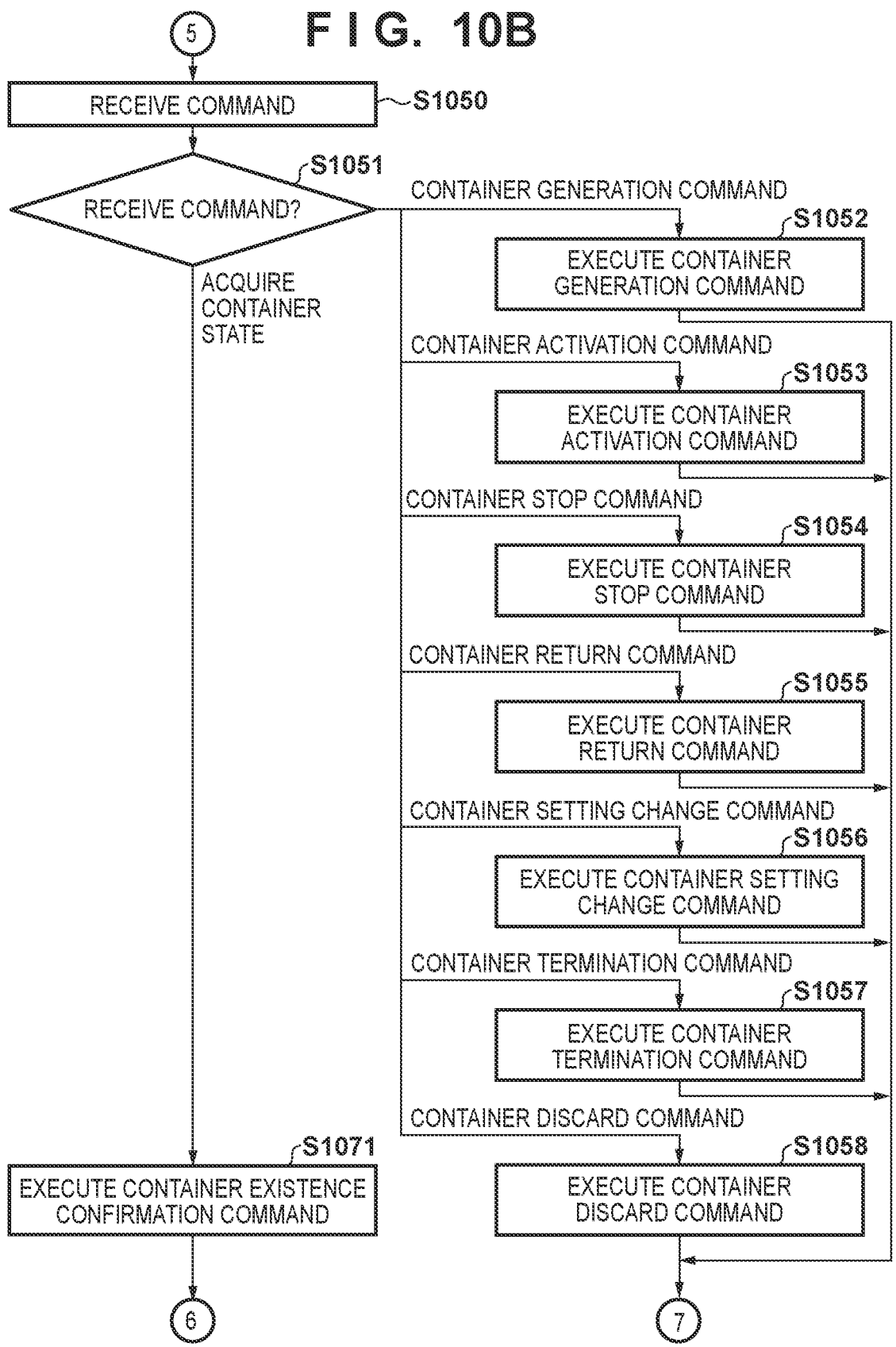
Figure 10C:
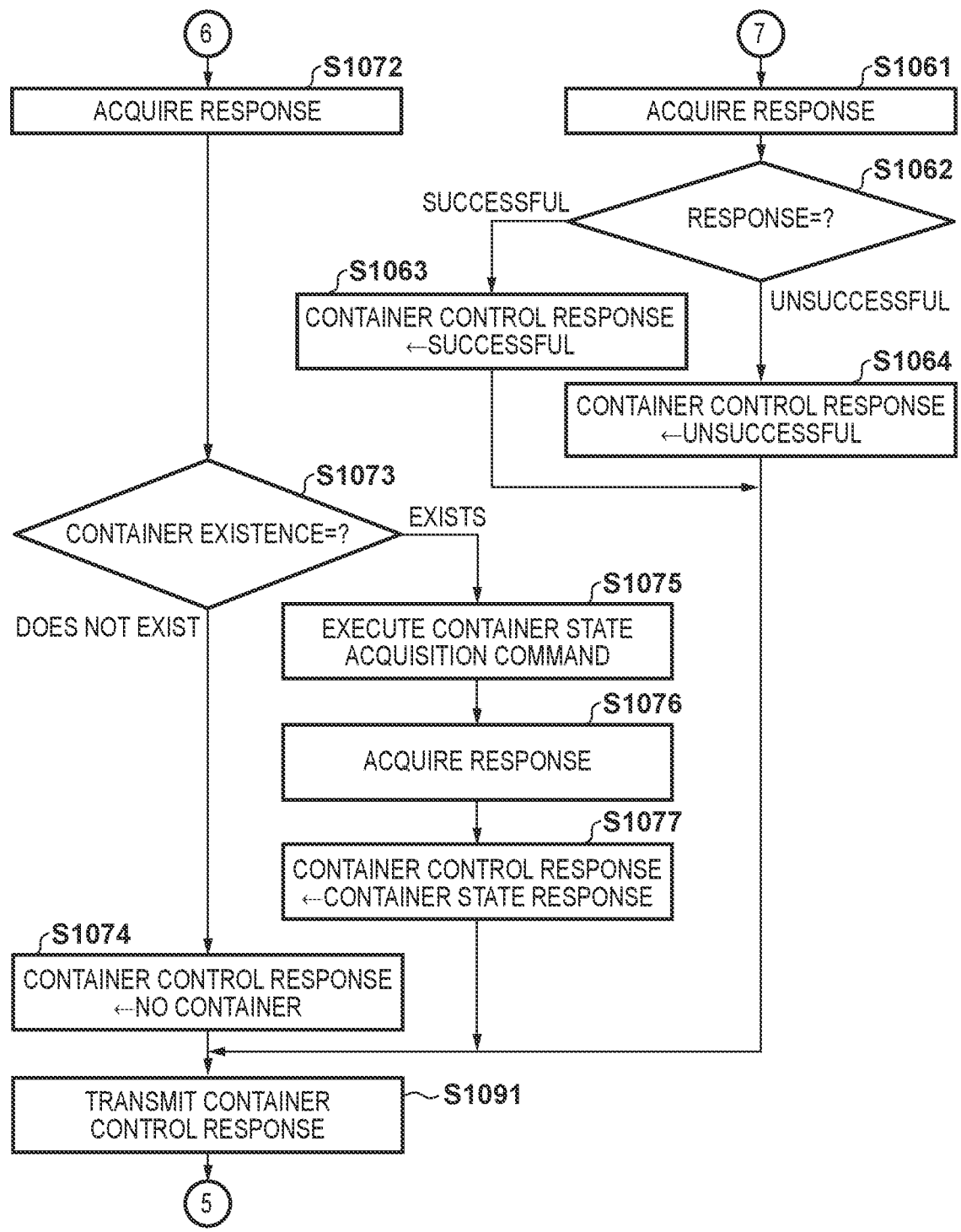

Next, a processing procedure of the container control unit 221 according to the present embodiment will be described with reference to FIGS. 10A-10C. The processing to be described below is realized, for example, by the CPU 111 reading out to the RAM 113 and then executing, a control program that is stored in the ROM 112 and the internal storage 114.

Step S1001 indicates loop processing and the container control unit 221 repeats the processing in steps S1002 to S1007, S1011 to S1014, and S1021 for all the managed containers 222 to 225. In step S1002, the container control unit 221 executes a container state acquisition command in relation to the docker engine 511. Next, in step S1003, the container control unit 221 acquires a response to a state acquisition command from the docker engine 511. Then, in step S1004, the container control unit 221 switches the processing in accordance with the acquired response.

In a case where the response acquired in step S1004 is that the container is non-existing, the processing advances to step S1005 and the container control unit 221 executes a container generation command in relation to the docker engine 511. Next, in step S1006, the container control unit 221 acquires a response to a container generation command from the docker engine 511. Then, in step S1007, the container control unit 221 switches the processing in accordance with the acquired response. In a case where the acquired response fails to generate a container, the processing advances to step S1021 and the container control unit 221 records the fatal error occurrence and then continues the repeating processing.

Meanwhile, in a case where a response to a container state acquisition command in step S1004 is not that the container is non-existing or a response to a container generation command is successful in step S1007, the processing advances to step S1011. In step S1011, the container control unit 221 switches the processing in accordance with whether or not the corresponding container is in cooperative activation with a main body. In a case where it is in cooperative activation with a main body, the processing advances to step S1012 and the container control unit 221 executes a container activation command in relation to the docker engine 511. Next, in step S1013, the container control unit 221 acquires a response to a container activation command from the docker engine 511. Then, in step S1014, the container control unit 221 switches the processing in accordance with the acquired response. In a case where the container activation command fails, the processing advances to step S1021 and the container control unit 221 records the fatal error occurrence and then continues the repeating processing. Meanwhile, in a case where it is not in cooperative activation with a main body in step S1011 or in a case where the container activation command is not unsuccessful in step S1014, the repeating processing is continued as is.

By repeating the above processing, all the containers 222 to 225 that the container control unit 221 manages are generated. Then, the containers to which cooperative activation with a main body is designated on the container management information 600 of the container management information DB 501 will be in a container activation state (in other words, the same as CC_RESPONSE_RUNNING, 0x0001). Then, the container to which cooperative activation with a main body is not designated will be in a container non-activation state (in other words, the same as CC_RESPONSE_CREATED, 0x0000). When the repetitive process is ended, the processing advances to step S1041.

In step S1041, the container control unit 221, in the container activation processing targeting all the managed containers 222 to 225, switches the processing in accordance with whether or not a fatal error was recorded in step S1021. In a case where a fatal error is recorded, the processing advances to step S1042 and the container control unit 221 notifies a fatal error display request in relation to the operation unit control unit 201 and then ends the processing.

Meanwhile, in a case where a fatal error is not recorded, the processing advances to step S1050 and the container control unit 221 starts the processing for receiving a container control command and receives a container control command from the inside/outside of the device. Then, in step S1051, the container control unit 221 switches the processing in accordance with the received container control command.

In a case where the container control command received in step S1051 is a container generation command, the processing advances to step S1052 and the container control unit 221 executes a container generation command in relation to the docker engine 511. In a case where the received container control command is a container activation command, the processing advances to step S1053 and the container control unit 221 executes a container activation command in relation to the docker engine 511. In a case where the received container control command is a container stop command, the processing advances to step S1054 and the container control unit 221 executes a container stop command in relation to the docker engine 511. In a case where the received container control command is a container return command, the processing advances to step S1055 and the container control unit 221 executes a container return command in relation to the docker engine 511. In a case where the received container control command is a container setting change command, the processing advances to step S1056 and the container control unit 221 executes a container setting change command in relation to the docker engine 511. In a case where the received container control command is a container termination command, the processing advances to step S1057 and the container control unit 221 executes a container termination command in relation to the docker engine 511. In a case where the received container control command is a container discard command, the processing advances to step S1058 and the container control unit 221 executes a container discard command in relation to the docker engine 511. When each command is executed, the respective processes advance to step S1061.

Next, in step S1061, the container control unit 221 receives a response to each type of command executed by the docker engine 511. Then, in step S1062, the container control unit 221 switches the processing in accordance with the received response. In a case where the response to a command is successful, the processing advances to step S1063 and the container control unit 221 deems the response that is related to the container control command to be a successful response and advances to step S1091. Meanwhile, in a case where the response to a command is failed, the processing advances to step S1064 and the container control unit 221 deems the response related to the container control command to be a failed response and advances to step S1091.

In a case where the container control command received in step S1051 is a container state acquisition command, the processing advances to step S1071 and the container control unit 221 executes a container existence confirmation command in relation to the docker engine 511. Next, in step S1072, the container control unit 221 acquires a response to the container existence confirmation command of the above step S1071 from the docker engine 511. Then, in step S1073, the container control unit 221 switches the processing in accordance with whether the container exists. In a case where the container exists, the processing advances to step S1075 and the container control unit 221 executes the container state acquisition command in relation to the docker engine 511. Next, in step S1076, the container control unit 221 acquires a response to the container state acquisition command from the docker engine 511. Then, in step S1077, the container control unit 221 sets based on the response to the container state acquisition command, a response that is related to the container control command and advances the processing to step S1091. For example, if the corresponding container is in an activation state (RUNNING) on the docker engine 511, the response that is related to a container control command will be a container activation state (CC_RESPONSE_RUNNING, 0x0001). Meanwhile, in a case where a container does not exist in step S1073, the processing advances to step S1074 and the container control unit 221 sets the container control response to no container and then advances the processing to step S1091.

In step S1091, the container control unit 221 transmits a response to the container control command that was decided in the above processing to the transmission origin of the control command that was received in step S1050 and then returns the processing to step S1050.

By the above control, the container control unit 221, based on the container control command that is distributed within the device, can issue an appropriate command in relation to the docker engine 511 for controlling the containers and thereby control each container. By using the corresponding configuration, there is no need for each application, which transmits container control commands in relation to the container control unit 221 and receives responses to the container control commands, to be conscious of the type of library that realizes the containers. For example, although description is given using the conventional container management library docker in the present embodiment, it is possible to build a system using other container management libraries. It is extremely cumbersome to use for each container management library, a different container control command to be issued by an application. Therefore, by utilizing a bridge module that handles the entire container control such as the container control unit 221, it becomes possible to bridge the difference between the behaviors of each container library.

<Summary>

As a conventional design pattern for applications that realize a certain function, MVC consisting of model/view/controller is widely known. A view is a module that generates a display screen based on information that a model indicates. A controller is a module that accepts operations from a user and notifies the model. The model is a module that updates the view based on the content that was operated by the user. An MVC model is a design pattern that is often adopted in software including a user interface, for increasing reusability on a multiplatform.

However, with only the concept of the conventional MVC, the scale of applications to operate on containers becomes extremely large, thereby making it difficult to handle for an effective use of resources. Specifically, when all MVC modules are operated in containers, there are problems such as that it takes time to operate the containers in accordance with operation requests and that necessary resources increase. This is because in the conventional concept, causing a certain application to be in an activation state means the same thing as making it possible to provide all the functions in relation to the user.

In Japanese Patent Laid-Open No. 2018-129003, an application that operates on a virtual machine VM also includes a function to provide user interfaces. In other words, even in order to simply display to a user a setting screen, a confirmation screen, and the like, it is necessary to cause a virtual machine VM to transition to an operating state and then operate an application that provides screens. Accordingly, in a case where the technique is applied to an embedded device whose resources are very limited, in a duration from when a display of a screen is requested to when it is actually displayed, there is more than a little waiting time. In ergonomics, it is said that in a case where it takes one second or more, the user is made to recognize that responsiveness is decreasing, and it becomes important how much less the waiting time can be made.

Particularly, among image forming apparatuses, there are those comprising an application selection screen that is called a home screen (or a portal screen). It has a function, by the user selecting an icon that represents one function from the home screen, to display an application setting screen or execution screen that is associated with the corresponding icon. Note that in the above conventional technique, after an application is selected from an application selection screen, a virtual machine that includes the application is caused to transition from a stopped state to an operating state. Although processing to cause to transition from a stopped state to an operating state is different depending on the amount of memory or storage performance that the application needs, there is a possibility that approximately a few seconds are necessary.

As an alternative method, to cause the virtual machine VM to be in an operating state at a timing that the user logs in can be conceived. By this, it becomes possible to improve responsiveness of an application for when the application is selected. However, in such a case, approximately several tens of seconds of time becomes necessary from when the user performs a login request until the log in is completed. Additionally, by having many applications in an operating state, it also becomes difficult to achieve an effective use of the original hardware resources.

In the present embodiment, a management method for embedded applications in which the concept of the corresponding MVC is developed so as to provide outside the containers, portions that correspond to the view and controller and manage, within the containers, portions that correspond to the model, is proposed. By this, it becomes possible to divide in a certain application, portions that accept operation requests from the user and portions that execute the operation requests from the user. Also, by switching for each portion whether or not to activate, it becomes possible to realize an effective use of resources. For example, by causing the portions that correspond to the view and controller to be active at all times, it becomes possible to respond in real time in the main body firmware to the operations from the user. Also, by activating on the containers as necessary, the application execution portions that correspond to the model, it becomes possible to reduce resources that are required in the entire system even if a plurality of applications are installed.

In order to realize the above configuration, an image forming apparatus that provides at least one function according to the present embodiment comprises at least one first module configured to accept via a user interface, a request of a function to which each of the at least one first module corresponds and at least one second module configured to execute a function that corresponds to each of the at least one first module. Also the present image forming apparatus comprises a first control unit configured to notify a corresponding second module, the request that was accepted by the at least one first module and a second control unit configured to control, in accordance with the notification, the corresponding second module. Additionally, according to the present image forming apparatus, at least one first module is activated at all times from when the image forming apparatus is activated and at least one second module is generated as a container whose execution environment is independent of an operating system and an activation state thereof is controlled by an instruction from the second control unit. Accordingly, by virtue of the present embodiment, it becomes possible to appropriately apply a container technique to embedded devices, thereby enabling a guarantee of responsiveness in relation to user operations in addition to effectively utilizing hardware resources.

<Variation>

The present invention is not limited to the embodiments described above, and various variations are possible. By virtue of the present invention, configuration may be taken such that the provisional reception units 212 to 215 realize processing and functions other than notifying the main reception units with the control commands. For example, the provisional reception unit 212 to 215 may have a function to perform communication in relation to the printer unit control unit 271 and the scanner unit control unit 272 that the respective applications use and determine job acceptance feasibility (whether or not a job is executable). In such a case, even in a state in which the scanner unit control unit 272 is used by the Send job execution unit 242, the PDL job execution unit 243 can execute the printing processing using the printer unit control unit 271. However, although the copy job execution unit 241, in a case where the scanner unit control unit 272 is being used, can reserve job execution, it cannot immediately execute a job. These functions to determine job acceptance feasibility, in addition to being configured so as to be comprised by the respective execution units 241 to 244, may be configured so that the provisional reception unit 212 to 215 comprise them.

Also, some of the functions that the respective job execution units 241 to 244 comprise may be such that the provisional reception units 212 to 215 comprise them. For example, there are cases where the PDL job execution unit 243 has a function that temporarily spools print data that was notified from the LAN control unit 209 on the RAM 113 and the internal storage 114. However, unless the PDL container 224 is caused to be in an activation state by the container control unit 221, data reception cannot be started, and there is a possibility that the start of printing is delayed by a corresponding amount. Accordingly, configuration may be taken so that the PDL job provisional reception unit 214, w % bile the container control unit 221 is executing processing for activating/returning the PDL container 224, temporarily spools, in the RAM 113 or the internal storage 114, the print data. Then, the PDL job execution unit 243 executes processing including the print data that the PDL job provisional reception unit 214 had already received at the time of starting job execution. By this, the image forming apparatus 100, without waiting for activation or return of containers, can start spooling print data and can reduce processing delay.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-072372, filed on Apr. 14, 2020, which is hereby incorporated by reference herein in its entirety.

What is claimed is:

1. An image forming apparatus that provides at least one function, the image forming apparatus comprising:
   at least one memory device that stores a set of instructions; and
   at least one processor that executes the set of instructions to:
   generate at least one first module for accepting, via a user interface, a request of respectively corresponding function;
   activate the generated at least one first module at all times from when the image forming apparatus is activated;
   generate at least one second module for executing functions corresponding respectively to the at least one first module; and
   control an activation state of a corresponding second module, according to a request accepted by the at least one first module and a corresponding function;
   wherein
   the at least one second module is generated as a container of an execution environment that is independent of an operating system.

2. The image forming apparatus according to claim 1, wherein the at least one processor executes instructions in the at least one memory device to: in accordance with container management information of a corresponding function, control an activation state of the at least one second module.

3. The image forming apparatus according to claim 2, wherein the container management information further includes for each container, information related to allocation of hardware resources.

4. The image forming apparatus according to claim 2, wherein
   the at least one processor executes instructions in the at least one memory device to:
   in a case where the container management information of a corresponding function indicates setting as cooperative activation with a main body, when activating the first module, generate and then activate a corresponding second module, and
   in a case where the container management information of a corresponding function does not indicate setting as cooperative activation with a main body, when the first module accepts a request of a corresponding function, activate a corresponding second module.

5. The image forming apparatus according to claim 4, wherein
   the at least one processor executes instructions in the at least one memory device to:
   in a case where setting of a corresponding function is started via the user interface, generate and then activate the corresponding second module.

6. The image forming apparatus according to claim 4, wherein
   the at least one processor executes instructions in the at least one memory device to:
   in a case where it is detected that a sheet is placed on a tray of the image forming apparatus, generate and then activate the second module that corresponds to at least one function that is predicted will be executed.

7. The image forming apparatus according to claim 4, further comprising:
   a human detection sensor that detects a person, wherein
   the at least one processor executes instructions in the at least one memory device to:
   in a case where a person is detected by the human detection sensor in a predetermined range from the image forming apparatus, generate and then activate the second module that corresponds to at least one function that is predicted will be executed.

8. The image forming apparatus according to claim 1, wherein
   the at least one processor executes instructions in the at least one memory device to:
   in a case where, as a request of a corresponding function, a control command that is related to the function is received, acquire a state of a corresponding container and control the corresponding second module in accordance with the acquired state of the container.

9. The image forming apparatus according to claim 8, wherein the state of the container includes at least a non-existing state in which a container is not generated, a non-activation state in which a container is not activated, an activation state in which a container is activated, and a stopped state in which a container is stopped.

10. The image forming apparatus according to claim 9, wherein
    the at least one processor executes instructions in the at least one memory device to:
    in accordance with the request accepted by the at least one first module, in a case where a user who is currently logged in logs out, in a case where a fixed amount of time elapses without a job of the function being inputted after a job of a corresponding function ends, and in a case where a hardware resource falls below a predetermined value when activating another container and a usage frequency of a container is low or a fatal error has occurred, cause a corresponding container to pause and transition from the activation state to the stopped state.

11. The image forming apparatus according to claim 1, wherein the first module, as the user interface, controls a setting screen of a corresponding function.

12. The image forming apparatus according to claim 1, wherein the first module includes at least a portion of functions of the corresponding second module.

13. The image forming apparatus according to claim 1, wherein
    the second module
    includes at least one of a function to temporarily spool the request and a function to determine whether or not the request is executable.

14. The image forming apparatus according to claim 13, wherein
    the function to determine whether or not the request is executable is to determine whether or not execution is possible based on an operating state of another function that uses hardware that the image forming apparatus comprises.

15. A method of controlling an image forming apparatus, the method comprising:

generating at least one first module for accepting, via a user interface, a request of respectively corresponding function;

activating the generated at least one first module at all times from when the image forming apparatus is activated;

generating at least one second module for executing functions corresponding respectively to the at least one first module; and controlling an activation state of a corresponding second module, according to a request accepted by the at least one first module and a corresponding function, wherein, the at least one second module is generated as a container of an execution environment that is independent of an operating system.

16. A non-transitory computer-readable storage medium storing a computer program for causing a computer to execute each process in a method of controlling an image forming apparatus, the method comprising:

generating at least one first module for accepting, via a user interface, a request of respectively corresponding function;

activating the generated at least one first module at all times from when the image forming apparatus is activated;

generating at least one second module for executing functions corresponding respectively to the at least one first module; and controlling an activation state of a corresponding second module, according to a request accepted by the at least one first module and a corresponding function, wherein, the at least one second module is generated as a container of an execution environment that is independent of an operating system.

* * * * *